US009883008B2

(12) United States Patent
Ravichandran et al.

(10) Patent No.: US 9,883,008 B2
(45) Date of Patent: Jan. 30, 2018

(54) VIRTUALIZATION OF MULTIPLE DISTINCT WEBSITE HOSTING ARCHITECTURES

(71) Applicant: Endurance International Group, Inc., Burlington, MA (US)

(72) Inventors: Hari Ravichandran, Lexington, MA (US); James Christopher Lee, Highland, UT (US)

(73) Assignee: Endurance International Group, Inc., Burlington, MA (US)

( * ) Notice: Subject to any disclaimer, the term of this patent is extended or adjusted under 35 U.S.C. 154(b) by 618 days.

(21) Appl. No.: 14/031,012

(22) Filed: Sep. 18, 2013

(65) Prior Publication Data
US 2014/0164486 A1  Jun. 12, 2014
US 2017/0366648 A9  Dec. 21, 2017

Related U.S. Application Data

(63) Continuation of application No. 13/826,770, filed on Mar. 14, 2013, now abandoned, which is a
(Continued)

(51) Int. Cl.
*G06F 15/16* (2006.01)
*H04L 29/06* (2006.01)
(Continued)

(52) U.S. Cl.
CPC .............. *H04L 67/42* (2013.01); *H04L 67/10* (2013.01); *G06F 9/45533* (2013.01);
(Continued)

(58) Field of Classification Search
CPC .............. G06F 2201/815; G06F 9/4558; G06F 9/45533; G06F 9/5072
See application file for complete search history.

(56) References Cited

U.S. PATENT DOCUMENTS 6,557,036 B1  4/2003  Kavacheri et al.
6,721,713 B1  4/2004  Guheen et al.
(Continued)

FOREIGN PATENT DOCUMENTS

EP  2524321 A2  11/2012
HK  1176717     8/2013
(Continued)

OTHER PUBLICATIONS

Alonso, et al., "Webservices: Concepts, architecture and apllications", <URL: http://www.inf.ethz.ch/personal/alonso/Web-book/Chapter-5.pdf>*, 2004, pp. 123-149.
(Continued)

*Primary Examiner* — Chirag R Patel
*Assistant Examiner* — Rachel J Hackenberg
(74) *Attorney, Agent, or Firm* — GTC Law Group PC & Affiliates

(57) ABSTRACT

A system for virtualizing service delivery of a plurality of website hosting architectures includes a first website hosting architecture that is adapted to provide a plurality of website hosting services, a second website hosting architecture that is adapted to also provide a plurality of website hosting services. The system further includes a service delivery layer for delivering a portion of the plurality of website hosting services from the first and second website hosting architectures, and a virtualization layer configured to abstract the service delivery layer from each of the first website hosting architecture and the second website hosting architecture.

7 Claims, 10 Drawing Sheets

Related U.S. Application Data continuation-in-part of application No. 13/739,692, filed on Jan. 11, 2013, now Pat. No. 9,277,022, and a continuation-in-part of application No. 13/007,094, filed on Jan. 14, 2011, now Pat. No. 8,762,484, and a continuation-in-part of application No. 13/007,113, filed on Jan. 14, 2011, now abandoned, and a continuation-in-part of application No. 13/007,132, filed on Jan. 14, 2011, now Pat. No. 8,762,463, and a continuation-in-part of application No. 13/007,144, filed on Jan. 14, 2011, now Pat. No. 8,843,571, and a continuation-in-part of application No. 13/007,157, filed on Jan. 14, 2011, now abandoned, and a continuation-in-part of application No. 13/007,167, filed on Jan. 14, 2011, now abandoned, and a continuation-in-part of application No. 13/739,968, filed on Jan. 11, 2013.

(60) Provisional application No. 61/585,604, filed on Jan. 11, 2012, provisional application No. 61/295,506, filed on Jan. 15, 2010, provisional application No. 61/295,528, filed on Jan. 15, 2010, provisional application No. 61/303,281, filed on Feb. 10, 2010, provisional application No. 61/345,568, filed on May 17, 2010, provisional application No. 61/376,743, filed on Aug. 25, 2010.

(51) Int. Cl.
*H04L 29/08* (2006.01)
*G06F 9/455* (2006.01)
*G06F 9/50* (2006.01)

(52) U.S. Cl.
CPC ........ *G06F 9/45558* (2013.01); *G06F 9/5072* (2013.01); *G06F 2201/815* (2013.01)

(56) References Cited

U.S. PATENT DOCUMENTS

| | | |
|---|---|---|
| 6,792,458 B1 | 9/2004 | Muret et al. |
| 6,868,444 B1 | 3/2005 | Kim et al. |
| 6,901,377 B1 | 5/2005 | Rosenfeld et al. |
| 6,947,982 B1 | 9/2005 | McGann et al. |
| 7,155,462 B1 | 12/2006 | Singh et al. |
| 7,340,686 B2 | 3/2008 | Matthews et al. |
| 7,558,843 B2 | 7/2009 | Lipscomb et al. |
| 7,574,471 B2 | 8/2009 | Fotta et al. |
| 7,596,615 B2 | 9/2009 | Satkunanathan et al. |
| 7,716,226 B2 | 5/2010 | Barney |
| 7,752,313 B2 | 7/2010 | Adelman et al. |
| 7,844,513 B2 | 11/2010 | Smith |
| 7,849,202 B2 | 12/2010 | Muret et al. |
| 7,900,005 B2 | 3/2011 | Kotsovinos et al. |
| 7,945,652 B2 | 5/2011 | Tsao et al. |
| 7,991,764 B2 | 8/2011 | Rathod |
| 8,005,890 B2 | 8/2011 | Rachitsky et al. |
| 8,065,327 B2 | 11/2011 | Rosenfield et al. |
| 8,108,406 B2 | 1/2012 | Kenedy et al. |
| 8,140,681 B2 | 3/2012 | Adam et al. |
| 8,204,799 B1 | 6/2012 | Murray et al. |
| 8,266,478 B2 | 9/2012 | Fan et al. |
| 8,330,759 B1 | 12/2012 | Besbeas et al. |
| 8,359,016 B2 | 1/2013 | Lindeman et al. |
| 8,447,747 B1 | 5/2013 | Yi et al. |
| 8,533,580 B1 | 9/2013 | Xu |
| 8,554,635 B2 | 10/2013 | Chen et al. |
| 8,560,471 B2 | 10/2013 | Shama et al. |
| 8,595,338 B2 | 11/2013 | Ravichandran et al. |
| 8,601,098 B2 | 12/2013 | Adelman et al. |
| 8,650,191 B2 | 2/2014 | Connolly et al. |
| 8,762,463 B2 | 6/2014 | Ravichandran et al. |
| 8,762,484 B2 | 6/2014 | Ravichandran et al. |
| 8,805,973 B2 | 8/2014 | Schwimer |
| 8,819,121 B2 | 8/2014 | Ravichandran et al. |
| 8,819,122 B2 | 8/2014 | Ravichandran et al. |
| 8,819,207 B2 | 8/2014 | Ravichandran et al. |
| 8,825,746 B2 | 9/2014 | Ravichandran et al. |
| 8,843,571 B2 | 9/2014 | Ravichandran et al. |
| 8,849,807 B2 | 9/2014 | McLellan et al. |
| 8,856,685 B2 | 10/2014 | Liu |
| 8,862,105 B2 | 10/2014 | Mishra et al. |
| 8,935,314 B2 | 1/2015 | Ravichandran et al. |
| 9,071,552 B2 | 6/2015 | Ravichandran et al. |
| 9,071,553 B2 | 6/2015 | Ravichandran et al. |
| 9,110,750 B2 | 8/2015 | Somani et al. |
| 9,197,517 B2 | 11/2015 | Ravichandran et al. |
| 9,277,022 B2 | 3/2016 | Lee et al. |
| 2002/0042733 A1 | 4/2002 | Lesandrini et al. |
| 2002/0052782 A1 | 5/2002 | Landesmann |
| 2002/0055974 A1 | 5/2002 | Hawkes et al. |
| 2002/0069079 A1 | 6/2002 | Vega |
| 2002/0073208 A1 | 6/2002 | Wilcock et al. |
| 2002/0073210 A1 | 6/2002 | Low et al. |
| 2002/0120554 A1 | 8/2002 | Vega |
| 2002/0143945 A1 | 10/2002 | Shahabuddin et al. |
| 2002/0147570 A1 | 10/2002 | Kraft et al. |
| 2002/0198933 A1 | 12/2002 | Kwak |
| 2003/0046371 A1 | 3/2003 | Falkner |
| 2003/0061404 A1 | 3/2003 | Atwal et al. |
| 2003/0069974 A1 | 4/2003 | Lu et al. |
| 2003/0105884 A1 | 6/2003 | Upton |
| 2003/0110242 A1 | 6/2003 | Brown et al. |
| 2003/0172145 A1 | 9/2003 | Nguyen |
| 2003/0177027 A1 | 9/2003 | DiMarco |
| 2003/0204843 A1 | 10/2003 | Barmettler et al. |
| 2003/0220880 A1 | 11/2003 | Lao et al. |
| 2003/0224781 A1 | 12/2003 | Milford et al. |
| 2004/0030740 A1 | 2/2004 | Stelting |
| 2004/0078276 A1 | 4/2004 | Shimogori |
| 2004/0098302 A1 | 5/2004 | Feeley |
| 2004/0103339 A1 | 5/2004 | Chalasani et al. |
| 2004/0107125 A1 | 6/2004 | Guheen et al. |
| 2004/0220952 A1 | 11/2004 | Cheenath |
| 2004/0237082 A1 | 11/2004 | Alcazar et al. |
| 2005/0076132 A1* | 4/2005 | Roberts ............... G06Q 30/02 709/228 |
| 2005/0086197 A1 | 4/2005 | Boubez et al. |
| 2005/0193093 A1 | 9/2005 | Mathew et al. |
| 2005/0228856 A1 | 10/2005 | Swildens et al. |
| 2005/0228984 A1 | 10/2005 | Edery et al. |
| 2005/0246441 A1 | 11/2005 | Chandrasekaran et al. |
| 2005/0283395 A1 | 12/2005 | Lesandrini et al. |
| 2006/0020525 A1 | 1/2006 | Borelli et al. |
| 2006/0085408 A1 | 4/2006 | Morsa et al. |
| 2006/0107314 A1 | 5/2006 | Cataldi |
| 2006/0129654 A1 | 6/2006 | Sato |
| 2006/0165040 A1 | 7/2006 | Rathod et al. |
| 2006/0235986 A1 | 10/2006 | Kim |
| 2006/0253365 A1 | 11/2006 | Langshur et al. |
| 2006/0253596 A1 | 11/2006 | Barone et al. |
| 2006/0288115 A1 | 12/2006 | Neuman |
| 2007/0011209 A1 | 1/2007 | Wietlisbach et al. |
| 2007/0038516 A1 | 2/2007 | Apple et al. |
| 2007/0061465 A1 | 3/2007 | Kim et al. |
| 2007/0067396 A1 | 3/2007 | Blinn et al. |
| 2007/0100739 A1 | 5/2007 | Cui et al. |
| 2007/0150480 A1 | 6/2007 | Hwang et al. |
| 2007/0153691 A1 | 7/2007 | Halpern |
| 2007/0244977 A1 | 10/2007 | Atkins et al. |
| 2007/0283348 A1 | 12/2007 | White |
| 2007/0299931 A1 | 12/2007 | Furphy et al. |
| 2008/0065677 A1 | 3/2008 | Howard et al. |
| 2008/0082569 A1 | 4/2008 | Mansour et al. |
| 2008/0147812 A1 | 6/2008 | Curtis |
| 2008/0147856 A1 | 6/2008 | Lee et al. |
| 2008/0201421 A1 | 8/2008 | Adelman et al. |
| 2008/0222375 A1 | 9/2008 | Kotsovinos et al. |
| 2008/0243634 A1 | 10/2008 | Dworkin et al. |
| 2008/0270515 A1 | 10/2008 | Chen et al. |
| 2008/0281915 A1 | 11/2008 | Elad et al. |
| 2009/0037875 A1 | 2/2009 | Jones et al. |

(56) References Cited

U.S. PATENT DOCUMENTS

| | | |
|---|---|---|
| 2009/0083272 A1 | 3/2009 | Li et al. |
| 2009/0125377 A1 | 5/2009 | Somji et al. |
| 2009/0132698 A1 | 5/2009 | Barnhill |
| 2009/0150995 A1 | 6/2009 | Hogan et al. |
| 2009/0182605 A1 | 7/2009 | Lappas et al. |
| 2009/0192879 A1 | 7/2009 | Hood et al. |
| 2009/0204964 A1* | 8/2009 | Foley .................. G06F 21/53 718/1 |
| 2009/0234887 A1 | 9/2009 | Rosenfield et al. |
| 2009/0276771 A1* | 11/2009 | Nickolov ............ G06F 9/4856 717/177 |
| 2009/0292545 A1 | 11/2009 | Mohammed et al. |
| 2009/0323593 A1 | 12/2009 | Barone et al. |
| 2010/0076863 A1 | 3/2010 | Golomb |
| 2010/0095067 A1 | 4/2010 | Kosaraju et al. |
| 2010/0106764 A1 | 4/2010 | Chadwick et al. |
| 2010/0114654 A1 | 5/2010 | Lukose et al. |
| 2010/0115490 A1 | 5/2010 | Wilcock et al. |
| 2010/0125826 A1 | 5/2010 | Rice et al. |
| 2010/0146119 A1 | 6/2010 | Lee |
| 2010/0153569 A1 | 6/2010 | Schreiber |
| 2010/0205302 A1 | 8/2010 | Rechterman |
| 2010/0306381 A1 | 12/2010 | Lublin et al. |
| 2010/0313196 A1 | 12/2010 | De Atley et al. |
| 2010/0318507 A1 | 12/2010 | Grant et al. |
| 2010/0325191 A1 | 12/2010 | Jung et al. |
| 2011/0010612 A1 | 1/2011 | Thorpe et al. |
| 2011/0010759 A1 | 1/2011 | Adler et al. |
| 2011/0055859 A1 | 3/2011 | Dasher et al. |
| 2011/0072073 A1 | 3/2011 | Curtis |
| 2011/0072312 A1 | 3/2011 | Fan et al. |
| 2011/0107294 A1 | 5/2011 | Ionfrida et al. |
| 2011/0161411 A1 | 6/2011 | Rechterman |
| 2011/0178831 A1 | 7/2011 | Ravichandran |
| 2011/0178838 A1 | 7/2011 | Ravichandran |
| 2011/0178840 A1 | 7/2011 | Ravichandran |
| 2011/0178865 A1 | 7/2011 | Ravichandran |
| 2011/0178869 A1 | 7/2011 | Ravichandran et al. |
| 2011/0178870 A1 | 7/2011 | Ravichandran et al. |
| 2011/0178890 A1 | 7/2011 | Ravichandran et al. |
| 2011/0179101 A1 | 7/2011 | Ravichandran et al. |
| 2011/0179102 A1 | 7/2011 | Ravichandran et al. |
| 2011/0179103 A1 | 7/2011 | Ravichandran et al. |
| 2011/0179111 A1 | 7/2011 | Ravichandran et al. |
| 2011/0179112 A1 | 7/2011 | Ravichandran et al. |
| 2011/0179135 A1 | 7/2011 | Ravichandran et al. |
| 2011/0179137 A1 | 7/2011 | Ravichandran et al. |
| 2011/0179141 A1 | 7/2011 | Ravichandran et al. |
| 2011/0179142 A1 | 7/2011 | Ravichandran et al. |
| 2011/0179145 A1 | 7/2011 | Ravichandran et al. |
| 2011/0179147 A1 | 7/2011 | Ravichandran et al. |
| 2011/0179150 A1 | 7/2011 | Ravichandran et al. |
| 2011/0179154 A1 | 7/2011 | Ravichandran et al. |
| 2011/0179155 A1 | 7/2011 | Ravichandran et al. |
| 2011/0179156 A1 | 7/2011 | Ravichandran et al. |
| 2011/0179165 A1 | 7/2011 | Ravichandran |
| 2011/0179175 A1 | 7/2011 | Ravichandran et al. |
| 2011/0179176 A1 | 7/2011 | Ravichandran et al. |
| 2011/0191163 A1 | 8/2011 | Allaire et al. |
| 2012/0004925 A1 | 1/2012 | Braverman et al. |
| 2012/0005148 A1 | 1/2012 | Horvitz et al. |
| 2012/0072312 A1 | 3/2012 | Lange et al. |
| 2012/0084155 A1 | 4/2012 | Roy et al. |
| 2012/0124204 A1 | 5/2012 | Robb et al. |
| 2012/0179566 A1 | 7/2012 | Soroca et al. |
| 2012/0198076 A1 | 8/2012 | Kancharla et al. |
| 2012/0284247 A1 | 11/2012 | Jiang et al. |
| 2012/0324377 A1 | 12/2012 | Allington et al. |
| 2013/0204746 A1 | 8/2013 | Lee et al. |
| 2013/0204966 A1 | 8/2013 | Lee et al. |
| 2013/0254035 A1 | 9/2013 | Ramer et al. |
| 2014/0215033 A1 | 7/2014 | Ravichandran et al. |
| 2016/0269500 A1 | 9/2016 | Lee et al. |

FOREIGN PATENT DOCUMENTS

| | | |
|---|---|---|
| WO | 2009111799 A2 | 9/2009 |
| WO | 2011088349 A2 | 7/2011 |
| WO | 2011088349 A3 | 10/2011 |
| WO | 2013106708 A1 | 7/2013 |

OTHER PUBLICATIONS

Gustavo, et al., "Web Services: Concepts, architectures and applications", Springer-Verlag, 2004, Chapter 5.2.4 and 5.3.3 (pp. 141 and 144-147), 27 pages.

Harding, "A-Server NV: Datacenter-as-a-Service (DAAS.com) Delivers Next Generation Cloud Computing for Service Providers.", <http://www.tmcnet.com/usubmit/2009/03/17/4062651.htm>, Mar. 17, 2009, 2 pages.

PCT/US11/21340, "International Application Serial No. PCT/US11/21340, International Search Report and Written Opinion mailed on Aug. 31, 2011", 8 pages.

PCT/US11/21340, "International Application Serial No. PCT/US11/21340, International Preliminary Report on Patentability mailed on Jul. 26, 2012", 5 pages.

PCT/US2013/021231, "International Application Serial No. PCT/US2013/021231, International Preliminary Report on Patentability With Written Opinion mailed Jul. 24, 2014", Endurance International Group, Inc., 10 Pages.

PCTUS2013021231, "International Application Serial No. PCTUS2013021231, International Search Report and Written Opinion mailed May 31, 2013", 13.

Svetnik, et al., "Random Forest: A Classification and Regression Tool for Compound Classification and QSAR Modeling", J. Chem. Inf. Comput. Sci. 2003,43, 1947-1958, Nov. 4, 2003, 12 Pages.

Underwood, et al., "Web Hosting: An Overview, Gartner Technical Report", 2001, online: http://marcusball.com/marcusball/opinion/CS3%200pinion/90803.pdf, 19 pages.

* cited by examiner

VIRTUALIZATION OF MULTIPLE DISTINCT WEBSITE HOSTING ARCHITECTURES

CROSS-REFERENCE TO RELATED APPLICATIONS

This application is a continuation of U.S. Ser. No. 13/826,770 filed Mar. 14, 2013 which is a continuation-in-part of U.S. Ser. No. 13/739,692 filed Jan. 11, 2013. U.S. Ser. No. 13/739,692 claims the benefit of U.S. provisional application Ser. No. 61/585,604 filed Jan. 11, 2012.

U.S. Ser. No. 13/826,770 is a continuation-in-part of U.S. Ser. No. 13/007,094 filed Jan. 14, 2011 which claims the benefit of the following U.S. provisional applications: U.S. Ser. No. 61/295,506 filed Jan. 15, 2010; U.S. Ser. No. 61/295,528 filed Jan. 15, 2010; U.S. Ser. No. 61/303,281 filed Feb. 10, 2010; U.S. Ser. No. 61/345,568 filed May 17, 2010; and U.S. Ser. No. 61/376,743 filed Aug. 25, 2010.

U.S. Ser. No. 13/826,770 is a continuation-in-part of U.S. Ser. No. 13/739,968 filed Jan. 11, 2013.

U.S. Ser. No. 13/826,770 is a continuation-in-part of the following applications: U.S. Ser. No. 13/007,113 filed Jan. 14, 2011; U.S. Ser. No. 13/007,132 filed Jan. 14, 2011; U.S. Ser. No. 13/007,144 filed Jan. 14, 2011; U.S. Ser. No. 13/007,157 filed Jan. 14, 2011; and U.S. Ser. No. 13/007,167 filed Jan. 14, 2011.

Each of the foregoing applications is incorporated herein by reference in its entirety.

BACKGROUND

Field of the Invention

The methods and systems described herein generally relate to a system for virtualizing web service delivery and more specifically for a system for virtualizing web service delivery for a plurality of website hosting architectures.

Description of the Related Art

Website hosting service delivery platforms provide website hosting services that are derived from a single website hosting architecture. Therefore merging two website hosting providers that operate different website hosting architectures results in a high degree of resource overlap to maintain service delivery due to directly supporting distinct website hosting architectures. Alternatively, merging two website hosting providers may require a substantive migration process to move all website hosting clients and websites from one website hosting architecture to another. Either option puts significant burdens on the operating, marketing, and financial resources of the merged website hosting service provider.

SUMMARY OF THE DISCLOSURE

Cloud computing has enabled the interaction between one or more IT service providers and a plurality of users over wide area networks (e.g., Internet) to provide a plurality of services and/or resources to the plurality of users. The plurality of services that may include an infrastructure as a service, a storage as a service, network as a service, data as a service, components as a service, a platform as a service, and the like may be presented to the plurality of users through user interfaces. Cloud computing may require extensive setup of how and when the services or the resources may be accessed, how data may be handled, and the like. In an example, providing storage as a service through the cloud computing may require first procuring and configuring large amount of scale storage and then allocating, managing the storage as per the requirements of the user. Further, the cloud computing may require creation, configuration, management of virtual machines to provides access to the plurality of services (e.g., web hosting, web presences services and the like) to the users. On the other hand, user-centric service oriented architecture may provide web presence services that take advantage of the tremendous computation and data storage capabilities of cloud environments by abstracting service delivery from underlying architectures. This may result in a user feature/service oriented approach to cloud computing and storage that does not require putting a burden of configuring or managing cloud computing resources on the user. The user may view the service delivery just as if there were no virtualization or cloud to configure because the details of the deployment and operational environment is managed below a virtualization layer in an automated manner. Clients who are new to web hosting, might only want to be provided with the services that get them the type of web presence that they desire without having to consider how or if virtualization (e.g. cloud-based resource capability) is impacting or benefiting the delivery of web hosting or web presence services.

This may be particularly important for handling different web hosting architectures because each architecture might have its own user interface that needs to be addressed. This architecture-specific UI might need to be preserved throughout the virtualization process for legacy clients, whereas a common web presence UI might be provided to new web hosting clients that may not dependent on the underlying website hosting architecture. Virtualization of web presence service presentation (e.g. UI) not only can provide this flexibility but it may be important to do so as noted above.

Methods and systems disclosed herein may be configured to include a website hosting and web presence delivery environment that facilitates delivering website presence and hosting services using one or more virtualization techniques to achieve, among other things scalability and increased performance across different website hosting computing architectures. Individuals, commercial, non-commercial and government organizations access websites and website hosting services via world-wide-web servers that comprise a variety of different computing architectures. These computer servers may employ different website hosting architectures to provide web presence hosting services via networks, such as the Internet or other external network. The web presence and website hosting services may include without limitations email services, HTML services, website generation, behavior tracking, transactional services, data access (e.g. FTP), media streaming, e-commerce, and the like. The services can be delivered to a client by any of a wide variety of hosting architectures. Some architectures provide website hosting services through a plurality of hosting servers (e.g. web servers). Each type of website hosting architecture may provide access to content and other website hosting data related to the hosting clients and their respective hosted websites through a shared storage as disclosed elsewhere herein.

An implementation of virtualization technology to abstract website hosting service delivery from two different website hosting architectures may further enhance flexibility because virtualization can abstract service delivery so that software stacks that provide website hosting service and web presence service delivery functionality and related capabilities may be deployed and redeployed without requiring any specific hosting architecture. In an example, a virtualized web presence and/or website hosting services environment may be configured to abstract delivery of services from at least two distinct website hosting services architectures. The two distinct website hosting and/or web presence services architectures may include without limitations at least two of a cloud computing architecture, a grid computing architecture, a virtual server computing architecture, a one box per website architecture, a one box per client architecture, a dedicated services per website architecture, and a common service platform architecture with or without service pools. Any combination of the distinct architectures described herein, and others that may be known now or in the future to one skilled in the art may be abstracted via a virtualization layer as described herein.

Further, virtualization of website hosting and/or web presence service delivery may facilitate use of dynamic data storage and processing techniques, such as to pool web server and data storage resources for use by different website hosting architectures. The different website hosting architectures may access and harness the pooled resources so that relationships of applications with computational, storage, and network resources may change dynamically in order to meet both workload and business demands. With application deployment and execution decoupled via a virtualization layer from the distinct underlying website hosting architectures, the web presence services, hosting services and the like may be deployed and scaled rapidly, without having to first procure or commission dedicated physical web servers. Virtualization may allow implementation of virtual machines as the prevalent abstraction for service deployment at least because virtual machines may provide an easily managed common interface with hosting service providers, clients, affiliates, distinct website hosting architectures, and developers. Exemplary virtual machines may include software that is partially or fully configured to perform a specific task, such as delivery of web presence services, website hosting services, and the like to enhance the ability to create and deploy applications rapidly.

A web presence service or website hosting platform may deploy a virtualization layer that connects to relevant aspects of two or more distinct website hosting architectures. The layer may allow user interface and web presence configuration and/or operational applications to access and abstract services from the two or more distinct website hosting service architectures. The layer may provide a virtualization framework for provisioning virtualization services at the client end and improving efficiency and availability of resources and services for the client by dynamically applying virtualization capabilities in the website hosting platform.

Methods and systems described herein of website hosting architecture virtualization may include a website hosting platform that delivers website hosting services via a virtualization layer that abstracts service delivery from at least two distinct website hosting services architectures. The methods and systems may include a first website hosting environment adapted to provide a plurality of website hosting services from a first website hosting architecture; a second website hosting environment adapted to provide a plurality of website hosting services from a second website hosting architecture; a service delivery layer for delivering a portion of the plurality of website hosting services from the first and second website hosting architectures; and a virtualization layer configured to abstract the service delivery layer from each of the first website hosting architecture and the second website hosting architecture.

Methods and systems described herein of website hosting architecture virtualization may include a website hosting platform that delivers website hosting services to a plurality of unrelated websites that are hosted by a plurality of distinct website hosting services architectures via a website hosting services virtualization layer. The methods and systems may include a website hosting platform that is adapted to deliver website hosting services to a plurality of unrelated websites including a first website hosting architecture for providing website hosting services; a second website hosting architecture that is distinct from the first website hosting architecture and is for providing website hosting services; and a virtualization layer configured to serve website hosting services to a portion of the plurality of unrelated websites from the first website hosting architecture and the second website hosting architecture by abstracting serving website hosting services to the unrelated websites from each of the first website hosting architecture and the second website hosting architecture.

Methods and systems described herein of website hosting architecture virtualization may include a website hosting platform that delivers a consistent user experience from two distinct website hosting services architectures via a virtualization layer. The methods and systems may include a website hosting platform that includes a first website hosting architecture for providing website hosting services; a second website hosting architecture that is distinct from the first website hosting architecture and is for providing website hosting services;

a website hosting client user interface for providing website hosting services to a website hosting client; and a virtualization layer that abstracts the website hosting client user interface from the first and second website hosting architectures and that adapts interactions with each of the first and second website hosting architectures to facilitate providing a user a consistent experience via the website hosting user interface for all user interactions with the first and second website hosting architectures.

Methods and systems described herein of website hosting architecture virtualization may include a web presence service platform for providing web presence services for a plurality of unrelated websites that are hosted by at least two distinct website hosting services architectures via a website hosting services virtualization layer. The methods and systems may include a web presence services platform that is adapted to deliver web presence services to a plurality of unrelated websites that includes a first website hosting architecture for hosting a first portion of the unrelated websites; a second website hosting architecture that is distinct from the first website hosting architecture and is for hosting a second portion of the unrelated websites; and a virtualization layer configured to serve web presences services to the plurality of unrelated websites by abstracting serving web presences services to the unrelated websites from each of the first website hosting architecture and the second website hosting architecture.

Methods and systems described herein of website hosting architecture virtualization may include a web presence service platform that uses virtualization to abstract providing web presence services from at least two different web hosting architectures, wherein at least one of the at least two different web hosting architectures is a common website hosting services architecture. The methods and systems may include a system that includes a first website hosting architecture adapted to provide a plurality of website hosting services; a common services website hosting architecture adapted to provide a plurality of common website hosting services; a service delivery layer for delivering web presence services to a plurality of unrelated websites, a first portion of which is hosted by the first website hosting architecture and a second portion of which is hosted by the common services website hosting architecture; and a virtualization layer configured to abstract the web presence service delivery layer from the first website hosting architecture and the common services website hosting architecture. In these methods and systems, the common services website hosting architecture comprises a plurality of service pools that are adapted to provide a single common website hosting service per service pool.

Methods and systems described herein of website hosting architecture virtualization may include a web hosting service platform that uses virtualization to abstract website hosting service delivery from at least two different web hosting architectures, wherein at least one of the at least two different web hosting architectures is a common website hosting services architecture. The methods and systems may include a system that may include a first website hosting architecture adapted to provide a plurality of website hosting services; a common services website hosting architecture adapted to provide a plurality of common website hosting services; a service delivery layer for delivering a portion of the plurality of website hosting services from the first website hosting architecture and from the common services website hosting architectures; and a virtualization layer configured to abstract the service delivery layer from the first website hosting architecture and the common services website hosting architecture. In these methods and systems the common services website hosting architecture comprises a plurality of service pools that are adapted to provide a single common website hosting service per service pool.

Methods and systems described herein of website hosting architecture virtualization may include a web presence service platform that uses virtualization to abstract providing web presence services from a common website hosting services architecture and each of several different website hosting architectures including a dedicated environment (e.g. server blade or box) per client, a dedicated environment (e.g. server blade or box) per domain (website), cloud computing, grid computing, virtual server, single server serving multiple websites, common website hosting services, and service pools based architectures. The methods and systems may include a web presence services platform that is adapted to deliver web presence services to a plurality of users that includes a website hosting interface facility for interacting with a website hosting system that comprises a common services website hosting architecture for providing common website hosting services and a one client per server website hosting architecture for providing website hosting services; a web presence service delivery layer for delivering web presence services based on interactions via the website hosting interface facility with the website hosting system to the plurality of users; and a virtualization layer configured to abstract the website hosting interface facility from each of the common services website hosting architecture and the one client per server website hosting architecture.

These methods and systems may include a web presence services platform that is adapted to deliver web presence services to a plurality of users that includes a website hosting interface facility for interacting with a website hosting system that comprises a common services website hosting architecture for providing common website hosting services and a one domain per server website hosting architecture for providing website hosting services; a web presence service delivery layer for delivering web presence services based on interactions via the website hosting interface facility with the website hosting system to the plurality of users; and a virtualization layer configured to abstract the website hosting interface facility from each of the common services website hosting architecture and the one domain per server website hosting architecture.

These methods and systems may include a web presence services platform that is adapted to deliver web presence services to a plurality of users that may include a website hosting interface facility for interacting with a website hosting system that comprises a common services website hosting architecture for providing common website hosting services and a cloud-based website hosting architecture for providing website hosting services; a web presence service delivery layer for delivering web presence services based on interactions via the website hosting interface facility with the website hosting system to the plurality of users; and a virtualization layer configured to abstract the website hosting interface facility from each of the common services website hosting architecture and the cloud-based website hosting architecture.

These methods and systems may include a web presence services platform that is adapted to deliver web presence services to a plurality of users that may include a website hosting interface facility for interacting with a website hosting system that comprises a common services website hosting architecture for providing common website hosting services and a grid-based website hosting architecture for providing website hosting services; a web presence service delivery layer for delivering web presence services based on interactions via the website hosting interface facility with the website hosting system to the plurality of users; and a virtualization layer configured to abstract the website hosting interface facility from each of the common services website hosting architecture and the grid-based website hosting architecture.

These methods and systems may include a web presence services platform that is adapted to deliver web presence services to a plurality of users that may include a website hosting interface facility for interacting with a website hosting system that comprises a common services website hosting architecture for providing common website hosting services and a virtual server-based website hosting architecture for providing website hosting services; a web presence service delivery layer for delivering web presence services based on interactions via the website hosting interface facility with the website hosting system to the plurality of users; and a virtualization layer configured to abstract the website hosting interface facility from each of the common services website hosting architecture and the virtual server-based website hosting architecture.

These methods and systems may include a web presence services platform that is adapted to deliver web presence services to a plurality of users that may include a website hosting interface facility for interacting with a website hosting system that comprises a common services website hosting architecture for providing common website hosting services and a single server serving multiple websites website hosting architecture for providing website hosting services; a web presence service delivery layer for delivering web presence services based on interactions via the website hosting interface facility with the website hosting system to the plurality of users; and a virtualization layer configured to abstract the website hosting interface facility from each of the common services website hosting architecture and the single server serving multiple websites website hosting architecture.

These methods and systems may include a web presence services platform that is adapted to deliver web presence services to a plurality of users that may include a website hosting interface facility for interacting with a website hosting system that comprises a common services website hosting architecture for providing common website hosting services and a common website hosting services website hosting architecture for providing website hosting services; a web presence service delivery layer for delivering web presence services based on interactions via the website hosting interface facility with the website hosting system to the plurality of users; and a virtualization layer configured to abstract the website hosting interface facility from each of the common services website hosting architecture and the common website hosting services website hosting architecture.

These methods and systems may include a web presence services platform that is adapted to deliver web presence services to a plurality of users that may include a website hosting interface facility for interacting with a website hosting system that comprises a common services website hosting architecture for providing common website hosting services and a service pools-based website hosting architecture for providing website hosting services; a web presence service delivery layer for delivering web presence services based on interactions via the website hosting interface facility with the website hosting system to the plurality of users; and a virtualization layer configured to abstract the website hosting interface facility from each of the common services website hosting architecture and the service pools-based website hosting architecture.

Methods and systems described herein of website hosting architecture virtualization may include a website hosting services platform that uses virtualization to abstract website hosting service delivery from a common website hosting services architecture and each of several different website hosting architectures including a dedicated environment (e.g. server blade or box) per client, a dedicated environment (e.g. server blade or box) per domain (website), cloud computing, grid computing, virtual server, single server serving multiple websites, common website hosting services, and service pools based architectures. The website hosting services platform that is adapted to deliver website hosting services to a plurality of unrelated websites may include a common services website hosting architecture for providing common website hosting services; a one client per server website hosting architecture for providing website hosting services; and a virtualization layer configured to abstract delivery of website hosting services from each of the common services website hosting architecture and the one client per server website hosting architecture. The website hosting services platform that is adapted to deliver website hosting services to a plurality of unrelated websites may include a common services website hosting architecture for providing common website hosting services; a one domain per server website hosting architecture for providing website hosting services; and a virtualization layer configured to abstract delivery of website hosting services from each of the common services website hosting architecture and the one domain per server website hosting architecture.

The website hosting services platform that is adapted to deliver website hosting services to a plurality of unrelated websites may include a common services website hosting architecture for providing common website hosting services; a cloud-based website hosting architecture for providing website hosting services; and a virtualization layer configured to abstract delivery of website hosting services from each of the common services website hosting architecture and the cloud-based website hosting architecture.

The website hosting services platform that is adapted to deliver website hosting services to a plurality of unrelated websites may include a common services website hosting architecture for providing common website hosting services; a grid-based website hosting architecture for providing website hosting services; and a virtualization layer configured to abstract delivery of website hosting services from each of the common services website hosting architecture and the grid-based website hosting architecture.

The website hosting services platform that is adapted to deliver website hosting services to a plurality of unrelated websites may include a common services website hosting architecture for providing common website hosting services; a virtual server-based website hosting architecture for providing website hosting services; and a virtualization layer configured to abstract delivery of website hosting services from each of the common services website hosting architecture and the virtual server-based website hosting architecture.

The website hosting services platform that is adapted to deliver website hosting services to a plurality of unrelated websites may include a common services website hosting architecture for providing common website hosting services; a single server serving multiple websites website hosting architecture for providing website hosting services; and a virtualization layer configured to abstract delivery of website hosting services from each of the common services website hosting architecture and the single server serving multiple websites website hosting architecture.

The website hosting services platform that is adapted to deliver website hosting services to a plurality of unrelated websites may include a common services website hosting architecture for providing common website hosting services; a second common services website hosting architecture for providing website hosting services; and a virtualization layer configured to abstract delivery of website hosting services from each of the common services website hosting architecture and the second common services website hosting architecture.

The website hosting services platform that is adapted to deliver website hosting services to a plurality of unrelated websites may include a service pools-based common services website hosting architecture for providing common website hosting services; a distinct website hosting architecture for providing website hosting services; a virtualization layer configured to abstract delivery of website hosting services from each of the service pools-based common services website hosting architecture and the distinct website hosting architecture.

Methods and systems described herein of website hosting architecture virtualization may include a website hosting services platform that uses virtualization to abstract website hosting service delivery from two different website service hosting architectures selected from a set of architectures containing: a dedicated architecture (e.g. server blade or box) per client, a dedicated architecture (e.g. server blade or box) per domain (website), a cloud computing architecture, a grid computing architecture, a virtual server architecture, a single server serving multiple websites architecture, a service pools based architecture, and a common website hosting services architecture. The methods and systems may include a website hosting services platform that is adapted to deliver website hosting services to a plurality of unrelated websites that may include a common services website hosting architecture for providing common website hosting services; a second website hosting architecture selected from the set of website hosting architectures consisting of single client per server, single domain per server, cloud-based, grid-based, virtual server-based, single server serving multiple websites, service pools-based, and common website hosting services based, and for providing website hosting services; and a virtualization layer configured to abstract delivery of website hosting services from each of the common services website hosting architecture and the second website hosting architecture.

Methods and systems described herein of website hosting architecture virtualization may include a web presence service platform that uses virtualization to abstract providing web presence services from two different website service hosting architectures selected from a set of architectures containing: a dedicated architecture (e.g. server blade or box) per client, a dedicated architecture (e.g. server blade or box) per domain (website), a cloud computing architecture, a grid computing architecture, a virtual server architecture, a single server serving multiple websites architecture, a service pools based architecture, and a common website hosting services architecture. The methods and systems may include a web presence services platform that is adapted to deliver web presence services to a plurality of users that may include a website hosting interface facility for interacting with a website hosting system that comprises a common services website hosting architecture for providing common website hosting services and a second website hosting architecture selected from the set of website hosting architectures consisting of single client per server, single domain per server, cloud-based, grid-based, virtual server-based, single server serving multiple websites, service pools-based, and common website hosting services based, and for providing website hosting services; a web presence service delivery layer for delivering web presence services based on interactions via the website hosting interface facility with the website hosting system to the plurality of users; and a virtualization layer configured to abstract the website hosting interface facility from each of the common services website hosting architecture and the second website hosting architecture.

Methods and systems described herein of website hosting architecture virtualization may include a website hosting platform that delivers website hosting services from at least two distinct website hosting service architectures via distinct virtualization layers that abstract each website hosting service architecture from service delivery. The methods and systems may include a system that includes a first website hosting environment adapted to provide a plurality of website hosting services from a first website hosting architecture; a second website hosting environment adapted to provide a plurality of website hosting services from a second website hosting architecture; a service delivery layer for delivering a portion of the plurality of website hosting services from the first and second website hosting architectures; a first virtualization layer configured to abstract the service delivery layer from the first website hosting architecture; and a second virtualization layer configured to abstract the service delivery layer from the second website hosting architecture.

Methods and systems described herein of website hosting architecture virtualization may include a web presence service delivery platform that delivers website hosting and web presence automation via a virtualization layer that abstracts the service delivery from website hosting architectures and web presence automation. The methods and systems may include a web presence services platform that is adapted to deliver web presence services to a plurality of users that may include a web presence service delivery layer for delivering web presence services to the plurality of users based on interactions with a plurality of distinct website hosting architectures for providing website hosting services and based on interactions with a web presence automation facility for automatically configuring, installing, and activating web presence features; and a virtualization layer configured to abstract the web presence service delivery layer from the plurality of distinct website hosting architectures and from the web presence automation facility.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION

Figure 1:
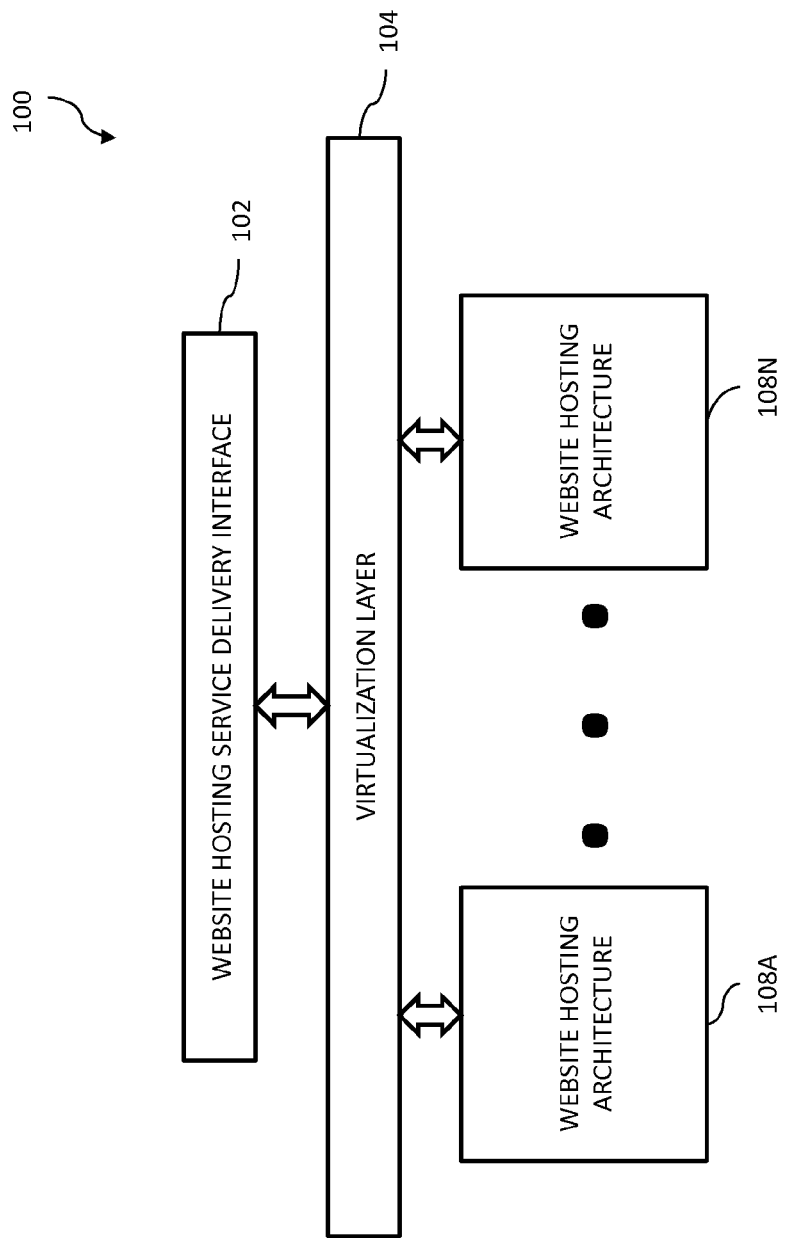
FIG. 1 depicts providing website hosting and related services via a virtualization layer from at least two distinct website hosting architectures.

The systems and methods disclosed herein may implement various virtualization techniques that may be used for abstracting at least two website hosting architectures. Typically, virtualization separates a resource or request for a service from the underlying physical delivery of that service. In an example, a virtual memory may provide computer software an access to more memory than the physically installed memory via the background swapping of data to disk storage. Similarly, virtualization techniques can be applied to other IT infrastructure layers including networks, storage, operating systems, computing architectures and the like to gain scalability, flexibility and optimal usage of resources while reducing the cost of IT operations. In recent days, different types of computing architecture are being used for providing web hosting services to the plurality of users generally in millions. Therefore, an extensive 'scale-out' and multi-tier application architectures are commonly used in the computing environment for delivering website hosting services. An introduction of a virtualization layer for abstracting the service delivery from the at least two distinct website hosting services architectures may ensure a smooth delivery of website hosting services to the plurality of users.

The virtualization techniques may include implementation of the virtualization at a range of system layers including hardware-level virtualization, software level virtualization that may include operating system level virtualization, high-level language virtual machines. In an example, the hardware-level virtualization may include hardware-based partitioning capabilities and software level virtualization may include software-based partitioning capabilities. Further, one or more architectures, such as hosted and hypervisor architectures may be used with software-based partitioning for Unix/RISC and industry-standard x86 systems. The hosted approach may provide partitioning services on top of a standard operating system and support the broadest range of hardware configurations. The hypervisor architecture is a first layer of software installed on the x86-based system and this architecture may also be referred to as "bare metal" approach. In another example, the virtualization enables the hardware-independence for abstracting the website hosting service delivery from the at least two different website hosting architectures. As discussed, the virtualization process creates virtual machines that are highly portable, and can be moved or copied to any industry-standard (x86-based) hardware platform, regardless of the make or model. Further, during the process of generating the virtualization layer for abstracting the website hosting service delivery from the at least two different website hosting architectures various computing resources such as CPUs, main memory, and I/O, in addition to other software resources may be virtually generated and managed to facilitate an adaptive IT resource management, and greater responsiveness to changing business conditions.

The virtualization may further include para-virtualization techniques for abstracting the website hosting service delivery from the at least two different website hosting architectures. The para-virtualization may trade-off the compatibility of the operating system against performance for certain CPU-bound applications running on systems without virtualization hardware assist. The para-virtualized model may offer potential performance benefits when a guest operating system or application is 'aware' that it is running within a virtualized environment, and has been modified to exploit this.

In an example, the methods and systems for abstracting website hosting service delivery from the at least two different website hosting architectures may be implemented using technology and/or products such as the VMware Server, ESX Server, VMware's virtual machine (VM) VirtualCenter, VMotion™, and the like that may be offered by the VMware. Alternatively, the virtual abstraction layer may be created using technologies or products offered by other similar organizations.

Virtualization enables the isolation of other servers deployed in different computing architectures and facilitates allocation of resources among the servers of the different computing architectures and thereby, provides flexibility and optimal utilization of the resources in the delivery of web hosting services to the clients. Further, pooling of servers resources enables savings on the costs, for example, electricity, purchase requirements of hardware, maintenance costs, setting up of web server costs and other such operational costs.

In an example, a common service architecture may use service pools that may include a set of dedicated web servers providing a single website hosting service. A single box per website may use a single web server to provide all of the different website hosting services for a single website. Virtualization may abstract management of a website on the single box architecture and on the common services pool architecture so that the client performing the management functions will not need to be aware of what type of underlying website hosting architecture is being employed for hosting the website. An extension of this example is that the web presence services that allow maintenance of the two distinct websites might be abstracted so that the user interface (e.g. the user's view of the websites) can appear to be the same for both websites even though the two websites are hosted on very different architectures.

Methods and systems disclosed herein may be configured to include a website hosting and web presence delivery environment that facilitates delivering website presence and hosting services discussed above to a plurality of unrelated or unaffiliated websites that may be hosted by a plurality of distinct website hosting computing architectures. The distinct architectures may be any two or more of a cloud computing architecture, a grid computing architecture, a virtual server computing architecture, a one box per website architecture, a one box per client architecture, a dedicated services per website architecture, and a common service platform architecture with or without service pools.

Hosting of a plurality of unrelated websites may be done with a virtual abstraction layer deployed in a website hosting platform that may include at least two distinct website hosting architectures. In an example, each of the plurality of websites may be hosted by a separate one of the respective website hosting architectures. In another example, each of the plurality of websites may be hosted by more than one website hosting architectures such that requests of the website hosting services from a website out of the plurality of unrelated websites may be directed to one or more hosting services architectures based on several parameters such as type of the services, space requirement for the services, a client, and the like. Any one of the plurality of services or any one of the services architectures in the virtual network may be configured to be deployed to serve any one of the plurality of unrelated websites. The each of the plurality of services may be adapted to contribute to a distinct package of services for at least a plurality of unrelated websites.

The website hosting platform may use a virtualization layer and/or virtualization capabilities as described herein to provide a website hosting service or a service package to the plurality of unrelated websites from any of the hosting services architectures or a combination thereof from the distinct architectures to meet the website service requirements of the plurality of unrelated websites. Further, the hosting platform may be configured such that any of the virtual servers or a group of servers in the virtual network may serve any one or a group of websites from the plurality of unrelated websites. A package of services or a service package may be created that addresses specific needs, preferences, contractual requirements, subscription policies, and the like of a hosted website. In an aspect, each of the two or more architectures in the website hosting platform may provide a different package of services to at least a plurality of the unrelated websites. Exemplary packages of services may include without limitations a service package that may package a three email address service and an HTML service, a service package that may package a two hundred email address service, and a service package that may package one thousand email address service and a one thousand member chat service. Each distinct package may be associated with only one website of the plurality of unrelated websites, in an aspect. In another aspect, a package of services may be subscribed to by one or more websites.

By providing a virtualization layer that abstracts service delivery from an underlying website hosting architecture, a virtualization-enabled platform as described herein may allow access to distinct services from the two distinct website hosting architectures for a single website. In an example, a first website service from a first website hosting architecture (e.g. an email service from a cloud-based website hosting architecture) and a second service from a second website hosting architecture (e.g. a video streaming service from a common website services architecture) may be provided to a single website via the virtualization layer using the website hosting architecture virtualization techniques described herein. Virtualization may abstract management and delivery of the first and the second website services delivered using the corresponding first and second website hosting architectures and facilitate delivery of these services from the single website to the client without requiring any updating of the user interface therein. The user may not be aware that the services (that are accessed from the single website) are delivered from the distinct computing architectures. In addition, the virtualization provisioning may facilitate isolation of the resources of two different architectures that may be accessed while delivery of the services to the clients. The isolation of the resources for services delivered using distinct computing architectures may enhance the flexibility of the virtualization enable platform.

A website hosting platform may be configured to deliver the website hosting services in a pure or a partial virtual network from two or more distinct architectures from among those mentioned above. The virtualization layer deployed on the website hosting platform may facility delivery of hosting services to users of a plurality of unrelated websites in a manner that results in a consistent user experience of delivery of the services from multiple distinct hosting architectures. For example, a user may receive hosting services at one point of time from a cloud computing architecture while at another point of time may receive the hosting services from a grid architecture while having a consistent user experience throughout. In this example, virtualization of website hosting services may afford a website hosting service provider to select different website hosting architectures based on a variety of factors (e.g. geography, available resources, cost of resources, hosting subscription level, and the like) while providing a consistent user experience across all possible architectures. In another example of consistent user experience provided through virtualization of website hosting services, the user may receive a first hosting service from a cloud computing architecture while the user may receive a second, different hosting service from a grid architecture. In these examples, the virtualization layer may facilitate delivery of the services so that the user finds a consistent user experience across both the service architectures without needing to be aware of or deal with a transition from one architecture to another architecture at different point of time in the first example, or with receiving different services from two different website hosting architectures.

A web presence service platform may be configured to provide web presence services for websites that are hosted on at least two distinct website hosting architectures with the assistance of a virtualization layer that may provide a pure or partial virtual network of a plurality of virtual machines, virtual servers, and the like. In particular, the virtualization layer may facilitate the web presence service platform interfacing with the websites. In an example, a web hosting service provider may offer the web presence services to attract new customers to the web hosting service by initiating contact with the potential new customer based on the new customer's interest in establishing or enhancing a web presence. Virtualization may facilitate this contact by offering web presence services via a web presence service platform independently of the website hosting architecture being used for the website hosting services. In this example, a website hosting service aggregation facilitator may attract potential new website hosting customers for a variety of distinct website hosting providers, who use different website hosting service architectures, through a web presence platform that focuses on web presence factors rather than on particular website hosting services or website hosting services architecture factors. The web presence service platform may present or deliver the web presence services to a plurality of unrelated or unaffiliated websites that are hosted by at least two distinct website hosting services architectures. The website hosting services architectures may include two or more distinct services architectures from among a cloud computing architecture, a grid computing architecture, a virtual server computing architecture, a one box per website architecture, a one box per client architecture, a dedicated services per website architecture, and a common service platform architecture, and the like without limitations. A virtualization layer, similar to the virtualization layer discussed above in conjunction with a website services hosting platform, may be deployed on the web presence service platform to implement virtualization functionality to support use of multiple website hosting architectures. The virtualization layer may facilitate connecting to various aspects of two or more website hosting architectures in the virtual network of the web presence service platform.

In an example, the web presence service platform may be configured to provide a blogging service to the user to enhance the web presence of the user. The blogging service may be provided using a web presence service platform deployed on a computing architecture different from the computing architecture used by the website hosting services architecture. An implementation of a virtualization layer may facilitate provisioning of such type of service platform where web presence services and web hosting services are delivered using at least two distinct computing architectures as already discussed above. The user does not need to worry about the deployments perspective of the services and the virtualization feature of the platform may enable creation of a blogging website for user blog that may be deployed on a first computing architecture and the a normal website that may deployed on a second computing architecture such that first and second computing architectures are different.

In addition, the virtualization techniques may facilitate provisioning of additional server space for the blogging space service in order to provide the blogging features to the user. The additional server space may be used from a website hosting computing architecture difference from the website hosting computing architecture that may provide space to the user for the normal website. For example, the additional server space may be available in the form of one or more virtual partitions of a physical server deployed in a cloud computing environment whereas the normal website may be stored in a dedicated server environment. As a result, the users may get additional benefit of variable space for blogging with a fixed space for the website in two distinct computing environments. The website hosting service provider may benefit from virtualization by not having to acquire more server space for servicing user's blogging requests. Further, virtualization may help to avoid any delays that may otherwise occur due to setting up of an additional server for handling blogging feature, installation and configuration of an operating system, enabling the server to handle requests from websites that may belong to different web site hosting service architectures. The outcome of such an interaction may be that the user is rapidly provided the desired blogging features along with a webhosting contract through which the blog will be made available on the Internet.

In other aspects, if the user already has a preferred venue for the blog (e.g. the user has an existing website), the blog web presence feature may be automatically added to the user's website upon receipt of the website details from the user. Further, if a user may want to add a capability (e.g., a photo gallery capability, offer a shopping cart for checkout, or make available a customer survey tool) that may be available on the plurality of distinct computing architectures, the virtualization layer of the web presence service platform may facilitate automatic, easy and rapid installation and update of any of these or other web presence capabilities through a simple clickable interface that requires little more than selecting a feature and providing information about a target website. Thus, the virtualization layer may abstract the web presence services from the underlying computing architectures and enhance the flexibility of the web presence services platform that may enable the user to select any web presence service deployed on distinct computing architectures.

In an example, the method of delivery of web presence services may include understanding what the user needs to do to establish a basic web presence; prioritizing tasks and the ordering of tasks for a successful web presence; evaluating and selecting among available tools, features, and the like; performing web presence tasks quickly with minimal time, knowledge and effort; progressing confidently toward major web presence milestones; getting more value and utility out of a client web hosting arrangement and the like. The implementation of the abstraction layer using the one or more virtualization techniques as discussed above may enable the web presence service platform to abstract these solutions to these requirements or services from the underlying computing architectures.

As discussed above, a web presence service platform may deploy a virtualization layer virtualization to facilitate abstracting providing web presence services from at least two different web hosting architectures. In an aspect, at least one of the at least two different web hosting architectures may be a service pools based common website hosting services architecture. A service pool may include a plurality of servers each configured to serve the same website hosting service. The service pools based common website hosting services architecture may provide a plurality of services, from a plurality of service pools, to each of a plurality of unrelated websites. Because service pools may be implemented via a pool of virtual servers, combining a virtualization layer above the common services website hosting architecture may facilitate abstracting even further the underlying makeup of the common services architecture elements from web presence service delivery.

In addition to the web presence service platform connecting users to a common website hosting services architecture, the platform may benefit from a virtualization layer to connect users to at least one more website hosting architecture that is distinct from the common website hosting services architecture. In an example, the additional website hosting architecture may be a dedicated environment based architecture a server blade or box architecture. In an example, the server blade or box architecture may be a server blade or box per client architecture. In another example, the server blade or box architecture may be a server blade or box per domain or website architecture. In another aspect, the additional at least one architecture may be a cloud computing based architecture. In another aspect, the additional at least one architecture may be a grid computing based architecture. In another aspect, the additional at least one architecture may be a virtual server based architecture. In another aspect, the additional at least one architecture may be a single server serving multiple websites based architecture. In another aspect, the additional at least one architecture may be a common website hosting services architecture similar to the at least one website hosting services architecture discussed above. In another aspect, the additional at least one architecture may be service pools based architecture. Each such website hosting architecture may be adapted to interface with the virtualization layer so that a web presence services platform user may be unaware of which type (or which types) of website hosting architectures are being utilized for hosting the user's web presence services.

A web presence service platform may be configured with a multi-function virtualization layer interface that has the capability to abstract web presence services for any of a plurality of distinct website hosting architectures. In particular the virtualization layer may facilitate abstracting from a large virtualization set of architectures that may include a dedicated architecture, a server blade or box per client architecture and a server blade or box per domain or website architecture, a cloud computing architecture, a grid computing architecture, a virtual server architecture, a single server serving multiple websites architecture, a service pools based architecture, and a common website hosting services architecture, and the like. While the virtualization-enabled platform may work abstractly with only two distinct architectures, more than two architectures selected from the set of architectures may be supported.

The systems and methods described herein may disclose implementation of a virtual layer for abstracting the web presence services from the underlying architectures of the hosting websites. In an example, the consumer may access a first web presence service (e.g., electronic chatting) from a first web presence service platform deployed on a service pools based common website architecture and a second web presence service (e.g., presence of social networking sites) from a second web presence service platform deployed on a cloud computing architecture. Implementation of the virtual layer abstracts the delivery of first and second web presence services to the consumer may cause an enriched experience for the consumer as the UI can now allow the consumer to access the first and second web presence services from the respective distinct web presence service platforms using a single UI. The consumer may not need to worry about knowledge of the underlying distinct architectures as virtualization creates abstraction layer for abstracting the different and distinct web presence service architectures. The abstraction layer may include various function and codes that may facilitate an aggregation of web presence services for the consumer from the distinct web services computing architectures. In this example, the consumer merely accesses the first and second web presence services without realizing that the first and second web presence services are delivered from the different computing architecture. The consumer may perceive the disclosed web service presence platform as a unifier platform that may provide the consumer web presence services from a plurality of distinct computing architectures.

As described herein a website hosting service platform may deploy a virtualization layer to abstract website hosting services delivery from at least two different web hosting architectures. In an aspect, at least one of the at least two different web hosting architectures may be a service pools based common website hosting services architecture. In an example, the virtualization layer may be implemented above the service pools based common website services architecture, so that the underlying makeup of the common website services architecture elements may be abstracted from a user of the website hosting service platform. A user of the web hosting service may then interface with the virtualization layer, which in turn interfaces with the architectural elements of the common website service platform. The common website service architecture may be a service pools based architecture, and may itself be implemented by a pool of virtual servers. Each of these virtual servers may be implemented to serve requests of a plurality of users of web hosting services that have differing website hosting architectures. Thus, the virtualization layer may abstract all the architecture specific implementation details from these users.

In addition to the web hosting service platform connecting users to a common website hosting services architecture, the platform may benefit from a virtualization layer to connect users to at least one more website hosting architecture that is distinct from the common website hosting services architecture. In an example, the additional website hosting architecture may be a dedicated environment based architecture a server blade or box architecture. In an example, the server blade or box architecture may be a server blade or box per client architecture. In another example, the server blade or box architecture may be a server blade or box per domain or website architecture. In another aspect, the additional at least one architecture may be a cloud computing based architecture. In another aspect, the additional at least one architecture may be a grid computing based architecture. In another aspect, the additional at least one architecture may be a virtual server based architecture. In another aspect, the additional at least one architecture may be a single server serving multiple websites based architecture. In another aspect, the additional at least one architecture may be a common website hosting services architecture similar to the at least one website hosting services architecture discussed above. In another aspect, the additional at least one architecture may be service pools based architecture. Each such website hosting architecture may be adapted to interface with the virtualization layer so that a web presence services platform user may be unaware of which type (or which types) of website hosting architectures are being utilized for hosting the user's web presence services.

In an example, the web presence service platform that uses virtualization to abstract website hosting service delivery from a service pools based common website hosting services architecture and a cloud computing architecture. The cloud computing architecture may provide software application services in an application service layer. The software applications (e.g., a commercially-available software application) can be installed on one or more virtual machines and the software application can also communicate with one or more infrastructure service components (e.g., firewalls, databases, web servers, etc.). In addition, a cloud service manager may be used in the cloud computing architecture for managing of cloud resources and services, including service enrollment, provisioning, coordination, monitoring, scheduling, starting or stopping virtual machines, managing cloud storage, installing and deploying software on virtual machines, setting of web servers or any other such service. An implementation of the virtualization layer on the web hosting service platform may enable the provision of delivering software application services in the cloud computing architecture in combination with the service pools based common website hosting services architecture by implementing an abstraction layer on the top of the cloud service manager. Further, the virtualization layer may include a hypervisor module to implement the abstraction layer to abstract the functionality of the operating environment of the different computing architectures from the users.

In an example, the web presence service platform that uses virtualization to abstract website hosting service delivery from a service pools based common website hosting services architecture and a grid computing architecture. The grid computing architecture may provide hosting services, web presence services, email, HTML services, website generation, behavior tracking, transactional services, data access (e.g. FTP), media streaming, e-commerce, and the like to the client. The grid computing architecture may enable multiple devices to share in providing a given service. In an example, the grid computing architecture may be utilized as a model for solving substantially large computational problems using large numbers of computers arranged as clusters embedded in a distributed infrastructure. The grid computing may be deployed for providing the web hosting and web presence services to attain an increased focus on resource sharing, coordination, manageability, and high performance of the computing resources. Using virtualization, a virtual infrastructure manager component may be implemented in a virtualization layer which may manage interfacing with the heterogeneous operating environments associated with service pools based common website hosting services architecture and the grid computing architecture. Thus, the virtualization layer may be used to abstract the heterogeneity of the common website hosting services architecture and grid architecture for providing the web hosting and web presence services across different computing architectures.

In an example, methods and systems disclosed herein may deploy a single server for web hosting applications delivery across the Internet or other external network to one or more organization. The web presence service platform that uses virtualization to abstract website hosting service delivery from a service pools based common website hosting services architecture and the single server architecture. The single server instance either may be a dedicated server for a particular client to provide high performance while delivery of the web hosting applications. Otherwise, an instance of the server may be shared by multiple organizations to achieve optimal utilization of the computing resources. The virtualization layer may enable partitioning of the server instance for optimizing the utilization of computing resources. The single server may be a real server or a virtual server providing various functionalities such as security, administrative, workload balancing, access policies, resource management, replication, high availability and the like to the one or more organizations that may utilize the server for delivery of the web hosting services. The virtualization layer may enable provisioning of web hosting services to a user operating from a service pools based common website hosting services architecture and from any type of the computing architecture described above for the additional at least one architecture. Virtualization may enable the users of both the types of architectures to interface with the virtualization layer in the same way, irrespective of their underlying architecture, as if the users were interfacing with a server dedicated to servicing requests from users of that type of architecture. Thus, the underlying architectural differences are completely abstracted from the users of service pools based architecture and the additional at least one architecture.

In an example, the website hosting services platform uses virtualization to abstract website hosting services delivery from two different website service hosting architectures selected from a set of architectures. Using the multi-functional virtualization layer that may be deployed above the distinct computing architectures, the methods and systems described herein can provide web hosting services to the users from at least two distinct computing architectures. The set of distinct architectures may include a dedicated architecture (e.g., server blade or box per client architecture and a server blade or box per domain or website architecture), a cloud computing architecture, a grid computing architecture, a virtual server architecture, a single server serving multiple websites architecture, a service pools based architecture, and a common website hosting services architecture. In an example, only two distinct of these architectures may be employed. In another example, more than two of these architectures may be deployed such that at least two of the deployed architectures are distinct.

A website hosting platform may be configured to deliver website hosting services from at least two distinct website hosting service architectures via distinct virtualization layers that abstract each website hosting service architecture from service delivery. Each of the at least two distinct website hosting service architectures may be associated with a distinct virtualization layer to provide abstraction. The two distinct website hosting architectures may include without limitations at least two of a cloud computing architecture, a grid computing architecture, a virtual server computing architecture, a one box per website architecture, a one box per client architecture, a dedicated services per website architecture, and a common service platform architecture with or without service pools.

The distinct virtualization layers may provide flexibility to the users of the virtualization enabled website hosting platform such that users from either of the two architectures may be able to avail website hosting services flexibly without facing any architecture specific limitations in the service delivery. In addition, the distinct virtualization layers may facilitate isolation of the resources of two different architectures that may be accessed while delivery of the services to the clients. The isolation of the resources for services delivered using distinct computing architectures may enhance the flexibility of the virtualization enabled platform.

A web presence service delivery platform may be configured to deliver website hosting and web presence automation via a virtualization layer that abstracts the service delivery from website hosting architectures and web presence automation. The web presence service platform may deliver these services by using the virtualization layer for abstracting the service delivery from a plurality of different service architectures to the user. This may offer greater flexibility, usability and variety to users who may desire to access both the website hosting as well as web presence services from the web presence service platform. A virtualization layer may enable the users to access both these services from a single web presence service platform. This may offer cost saving and effective resource utilization, as the users might not need to spend additional resources and/or fee for acquiring additional services from a different platform or service provider. The same web presence service platform may provide a unified solution for the user's requirements.

The virtualization layer may abstract service delivery from a plurality of website hosting service architectures and web presence automation service architecture. In an example, the web presence service platform may be configured to abstract delivery of services from at least two distinct website hosting services architectures. The two distinct website hosting and/or web presence services architectures may include without limitations at least two of a cloud computing architecture, a grid computing architecture, a virtual server computing architecture, a one box per website architecture, a one box per client architecture, a dedicated services per website architecture, and a common service platform architecture with or without service pools.

In an example, a client may desire to build a website for their business and at the same time avail web presence services automatically for effective marketing and analytics related to their business website. For example, a client may require to set-up a website for sale of electronic items and at the same time might require functionality in the website that enables buyers of electronic items on the website to be able to create and post comments on their blog about the electronic items. In this example, a user of the web presence service platform may offer both these services to the client by making use of the virtualization enabled web presence service delivery platform. The virtualization enabled web presence service delivery platform abstracts service delivery from website hosting architectures and web presence automation architectures, and offers both these services from a single layer to the users. Thus, while the client gets cost effective solutions for their business, the users of the web presence platform may be able to attract more clients and leverage the virtualization technology to increase their profits.

In an example, the virtualization layer may enable users of the web presence service platform to access a plurality of features of the automated web presence service offering. The features may include but are not limited to, automated web presence enablement, a catalog of web presence features such as purchasing a domain name, transferring a domain name, purchasing web hosting, and generating a webpage, a photo gallery, a shopping cart, a survey tool or any other. Users may be able to access these features along with website hosting services from different underlying architectures of the website hosting services, without the user being aware of the heterogeneity of the underlying architectures. For example, a user who requests for a new website from the web presence service platform may be offered a web catalog of web presence services that may also be availed. Some exemplary web presence services have been discussed above. The user may provide their preferences from the web presence catalog. Based on user preference, web presence service platform may automatically install user's web presence features during website installation. For this, the website hosting feature may be provided by the website hosting service architecture and web presence features may be provided by the web presence automated offering. The virtualization layer abstracts the delivery of these services from different architectures and provides a unified view of services to the user of the web presence service platform.

Control Panel Virtualization

The methods and systems disclosed herein may implement virtualization techniques for providing a user interface (UI) to the consumers so that the consumer may be able to access a plurality of web hosting and web presence services that may be delivered using the distinct computing architectures. Typically, each web hosting computing architecture may have its own UI for providing an access to the web hosting and/or we presence services to the consumers. The UI may be a control panel UI such as cPanel, vDeck, Plesk and other UIs that may be available to the consumers to access the services. The control panel UI may allow the consumers to access web hosting services from a particular computing architecture in a user-friendly environment. Further, the control panel UI may allow the consumers to create and modify the content associated with the websites and/or manage other services (storage allocations, spam filtering, bandwidth management, and the like) for the website. The provisioning of the virtualization techniques for developing a common UI for the user may lower cost of deployment and development across the different computing architectures. In an example, the virtualization techniques may create a virtual layer of the control panel for the assistance of the consumers such that the consumers are able to use the virtualized control panel regardless of the type of the control panel associated with a particular computing architecture. The virtual layer may abstract the specific control panels of the distinct computing architectures and provide a generalized control panel UI to the consumer so that consumer can manage the web hosting and/or web presence services delivered using the distinct web hosting computing architectures using a single control panel UI. In an example, the consumer may need to update a first web presence service (e.g., email service) for a plurality of websites that may be deployed on a cloud computing architecture and on a grid based computing architecture, the present systems and methods enable the consumer to update the email services without accessing the control panel interfaces of the cloud computing architecture and a service pools based common website hosting services architecture. The consumer may merely access the common control panel UI and update the email services for each of the computing architecture. Further, the implementation of the virtualization for the control panel may provide economical hosting solutions to the consumers, as the consumer is not worried about the custom developments for the various control panels corresponding to the different computing architectures.

Virtualization of Web Presence Service Delivery

Methods and systems disclosed herein relate to guided workflows for establishing a web presence of a customer using virtualization techniques as discussed above. The systems may include a suite of tools designed to engage web hosting customers by helping them in various ways including: quickly understanding what the customer needs to do to establish a basic web presence; prioritizing tasks and the ordering of tasks for a successful web presence; evaluating and selecting among available tools, features, and the like; performing web presence tasks quickly with minimal time, knowledge and effort; progressing confidently toward major web presence milestones; getting more value and utility out of a client web hosting arrangement, and the like.

The methods and systems may include a customer user interface with a guided workflow layer based on a knowledge base about the customer, wherein the customer interface allows a customer to manage a customer's web presence based on operation of a logic engine that accesses information about what a customer has done and who the customer is (e.g. type of business), wherein the user interface presents a guided workflow of tasks associated with a recommended area of improvement for the customer. The information may be provided by the customer through the user interface and stored in a database that may be a database of a host of the logic engine or an external database.

The web presence includes at least one of electronic communication (e.g. email), website, domain, and website-related tasks and the host is at least one of a customer, a reseller, an affiliate, a customer of a customer, a domain registrar, a web services provider, a cloud services provider, a network services provider, an online services provider, and an internet service provider, and the like.

Virtualization of the logic engine computing resources may facilitate operation of a web presence platform that itself leverages the benefits of virtualization. In this way user interactions with a virtualized web presence platform may appear no different to the user than if the resources were being delivered in a specific physical form. For example, various host functionality, such as the OS (operating system), database, hard disk space and the physical hard disk, and the memory can be virtualized while virtualization still providing web presence services to users. Virtualization of this service-oriented web presence platform may be extended further to virtualization of underlying website hosting architectures on which a web presence platform may be based.

Further, virtualization may enable abstraction of the web presence service capability from any of the web services hosting architecture. In other words, a virtualization layer may allow the delivery of the web presence services independent of any one of the computing architecture such as a cloud computing architecture, a grid computing architecture, a virtual server computing architecture, a one box per website architecture, a one box per client architecture, a dedicated services per website architecture, and a common service platform architecture that may be deployed while delivering website host services to the customers.

Cloud and Web Presence Service Delivery Virtualization

The methods and systems of guided workflows for establishing a web presence and the like described herein may use cloud computing in combination with virtualization of a web presence service layer to achieve flexibility, efficiency and scalability.

The above-mentioned suite of tools for establishing a web presence may be delivered with cloud-computing resources via virtual computing networks. In addition, the suite of web presence authoring and maintenance tools can be installed on one or more virtual machines in a cloud-based computing environment. Because different web hosting service customers who may want to avail the guided workflows for establishing or upgrading a web presence may have a website that is hosted on different computing architectures, a virtualization layer may enable interfacing these different architectures with a cloud-based web presence delivery platform. The virtualization layer may enable abstraction of the management of cloud resources and services from web hosting services operating in different architectural environments. The virtualization layer may be configured to implement virtualization techniques such as the hardware level virtualization, software level virtualization, para-virtualization and the like to deploy web presence service layer rapidly across different web hosting architectures.

Common Website Hosting Services Platform

Virtualization of web hosting architectures to facilitate abstracting service delivery (e.g. website hosting services and/or web presence services) from any two or more distinct website hosting architectures may include abstracting various services from an underlying common services architecture. Services that may be abstracted from a common service architecture may include analytic services for providing website hosting client survival analysis, product mapping analysis, client hazard analysis, customer retention hazard analysis, acquisition financial impact hazard analysis, customer by customer profiles, and the like. In particular analytics services may benefit from virtualization of web hosting architectures in that the analytics functions may be used for analysis of web hosting operations and the like for diverse web hosting architectures through virtualization. By separating the details of web hosting architectures from the gathering and analysis of web hosting data, a client survival analysis may be performed on data gathered from two distinct web hosting architectures without having to be encumbered with the web hosting architecture details. In this way a web hosting provider may be able to analyze client retention-related data across two or more distinct web hosting architectures. In an example, a web hosting provider or web hosting analytics provider may receive client retention-related data from a plurality of distinct web hosting architectures and deliver client retention analytics that is independent of specifics of the distinct hosting architecture. Therefore if a web hosting provider maintains hosting architectures for both a dedicated server-per-website architecture and a common service architecture, client retention analytics may be used based on the combined data to improve client retention for each of the two web hosting architectures. Application of other analytics services, such as product mapping, client hazard analysis, customer retention hazard analysis, acquisition financial impact hazard analysis, customer-by-customer profiles, and the like may benefit from virtualization similarly to client retention analysis.

Other services of a common service architecture that may be abstracted via one or more virtualization layers may include migration support for migrating web hosting services from a first website hosting architecture to a second website hosting architecture, wherein the website hosting architectures include any combination of a cloud computing architecture, a grid computing architecture, a virtual server computing architecture, a one box per website architecture, a one box per client architecture, a dedicated services per website architecture, a common service platform architecture with or without service pools, and the like. In particular certain features and functions related to migration may be kept constant no matter how different the source and/or destination hosting architectures are. By separating migration status, website hosting service conversion and the like from the underlying source and/or destination hosting architecture, uninterrupted website content and service migration may be successfully applied across a wide variety of source hosting architectures and destination hosting architectures. In particular, website migration from a variety of source hosting architectures to a common services architecture may be substantially automated. Also, as new source and/or destination architectures are brought into use, website migration may be readily adapted to accept new website hosting architectures.

Third-party services that may be provided by a common services architecture may be abstracted via a virtualization layer so that recipients of the third-party services may not need to be aware of the underlying architectures that provide the third-party services. Abstracting third-party services may allow for a degree of harmonization of service delivery among third-party and integrated common services architectures services. A virtualization layer that abstracts user or provider interfaces from underlying web hosting or related services may facilitate abstracting details of how third party services are integrated with an underlying web hosting architecture. In an example, a third-party service for facilitating backup of website related content (e.g. data provided by users of the website) may integrate with a web hosting architecture to provide backup capabilities. A client of the web hosting service that interfaces with the web hosting architecture via a virtualization layer may be able to access and/or take advantage of the third-party provided backup service without being burdened in any way with particulars of the third-party service architecture, the web hosting architecture, and the integration of the two.

Likewise, a third-party service may be provided to two or more distinct web hosting architectures via a virtualization layer that isolates the third-party service from details of the two web hosting architectures. IN this way, a third party service, such as a website security scanning service, may operate to scan websites hosted in two distinct hosting architectures, such as a grid-based architecture and a common services architecture as described herein.

A common services website hosting architecture may provide various customer support services that may be abstracted from the underlying common services architecture. Customer support services may include a universal component customer relationship module, a customer relationship module with a ticketing workflow, a customer relationship module with reporting, a customer service capability with service representative plug-in ability, and the like. In particular a universal component customer relationship module that is abstracted from underlying website hosting architectures may facilitate access by customer service representatives to key website client information for hosted websites as well as facilitate managing client customer service requests for a diversity of website hosting architectures without having to expose the underlying architecture details to the customer service representative. A customer service representative may assist two or more website hosting clients who have websites hosted on distinct website hosting architectures via a chat capability of the customer relationship module. By abstracting the customer support services via a virtualization layer from the underlying website hosting architectures, the customer support representative may concurrently assist a dedicated server website hosting architecture client and a common services architecture client without having to be exposed to the two distinct underlying website hosting architectures.

A common services website hosting architecture may include an operational support system that may interface with various other services and capabilities within the common services architecture including a virtualization layer through which the operational support system may provide access to capabilities such as customer service agents, a skins and code library to facilitate multiple branding of the common services, a common data store, load balancing of a service pool platform, business operations, and the like. In particular abstracting an operational support system from an underlying architecture may benefit inorganic growth of a website hosting provider by allowing the provider to acquire distinct website hosting service architectures (e.g. from competitors) without requiring that the acquired architecture be changed to a different architecture simply to provide operational support services.

FIG. 1 illustrates an exemplary embodiment of an architecture 100 providing website hosting and related services via a virtualization layer from at least two distinct website hosting architectures. The architecture 100 may be configured to include a website hosting service delivery interface 102 that may be abstracted from a plurality of website hosting architectures through the virtualization layer 104 to deliver website hosting and web presence related services to the users. The web hosting and web presence services may include without limitations email services, HTML services, website generation, behavior tracking, transactional services, data access (e.g. FTP), media streaming, e-commerce, and the like. The virtualization layer 104 may allow the user interface and web presence configuration and/or operational applications to access and abstract the delivery of these services from the two or more distinct website hosting service architectures.

Further, the virtualization layer 104 may provide a virtualization framework for provisioning virtualization services at the client end and improving efficiency and availability of resources and services for the client by dynamically applying virtualization capabilities in the website hosting platform. The virtualization layer 104 may utilize one or more virtualization techniques to achieve, among other things scalability and increased performance across different website hosting computing architectures. In an example, the virtualization layer 104 may be implemented using one or more virtualization techniques such as hardware level virtualization, software level virtualization including architectures such as hosted and hypervisor architectures, para-virtualization and the like to abstract the delivery of the services from the underlying website hosting architectures.

Users typically access websites and website hosting services via world-wide-web servers that comprise a variety of different computing architectures. These computer servers may employ different website hosting architectures to provide web presence hosting services via networks, such as the Internet or other external network. The services can be delivered to a client by any of a wide variety of hosting architectures. Some architectures provide website hosting services through a plurality of hosting servers (e.g. web servers). Each type of website hosting architecture may provide an access to content and other website hosting data related to the hosting clients and their respective hosted websites through a shared storage as disclosed elsewhere herein. The virtualization layer 104 abstract the delivery of these services from the underlying website hosting architectures so that the clients may not need to worry about the development of web based solutions specific to the web hosting architecture. The virtualization layer 104 may be implemented as an abstraction layer enabling the clients to independently deliver the services without customization of applications specific to the website hosting architecture. The virtualization layer 104 may provide a unified website hosting platform to the clients through the website hosting service delivery interface 102 so that clients can utilize the services and/or resources that may be offered by any one of the underlying website hosting architectures.

The virtualization layer 104 may enable an implementation of a common user interface (UI) for the clients so that clients may access the services as offered by any of the underlying website hosting architectures using the common user interface. This is particularly important for handling different web hosting architectures because each architecture might have its own user interface that needs to be addressed. This architecture-specific UI might need to be preserved throughout the virtualization process for legacy clients, whereas a common web presence UI might be provided to new web hosting clients that may not dependent on the underlying website hosting architecture.

As illustrated in FIG. 1, the plurality of different website hosting architectures may be represented as a website hosting architecture 108a through a website hosting architecture 108n. An implementation of virtualization technology to abstract website hosting service delivery from two different website hosting architectures may further enhance flexibility because virtualization can abstract service delivery so that software stacks that provide website hosting service and web presence service delivery functionality and related capabilities may be deployed and redeployed without requiring any specific hosting architecture. In an example, a virtualized web presence and/or website hosting services environment may be configured to abstract delivery of services from at least two distinct website hosting services architectures. The two distinct website hosting and/or web presence services architectures may include without limitations at least two of a cloud computing architecture, a grid computing architecture, a virtual server computing architecture, a one box per website architecture, a one box per client architecture, a dedicated services per website architecture, and a common service platform architecture with or without service pools. Any combination of the distinct architectures described herein, and others that may be known now or in the future to one skilled in the art may be abstracted via a virtualization layer as described herein.

Figure 2:
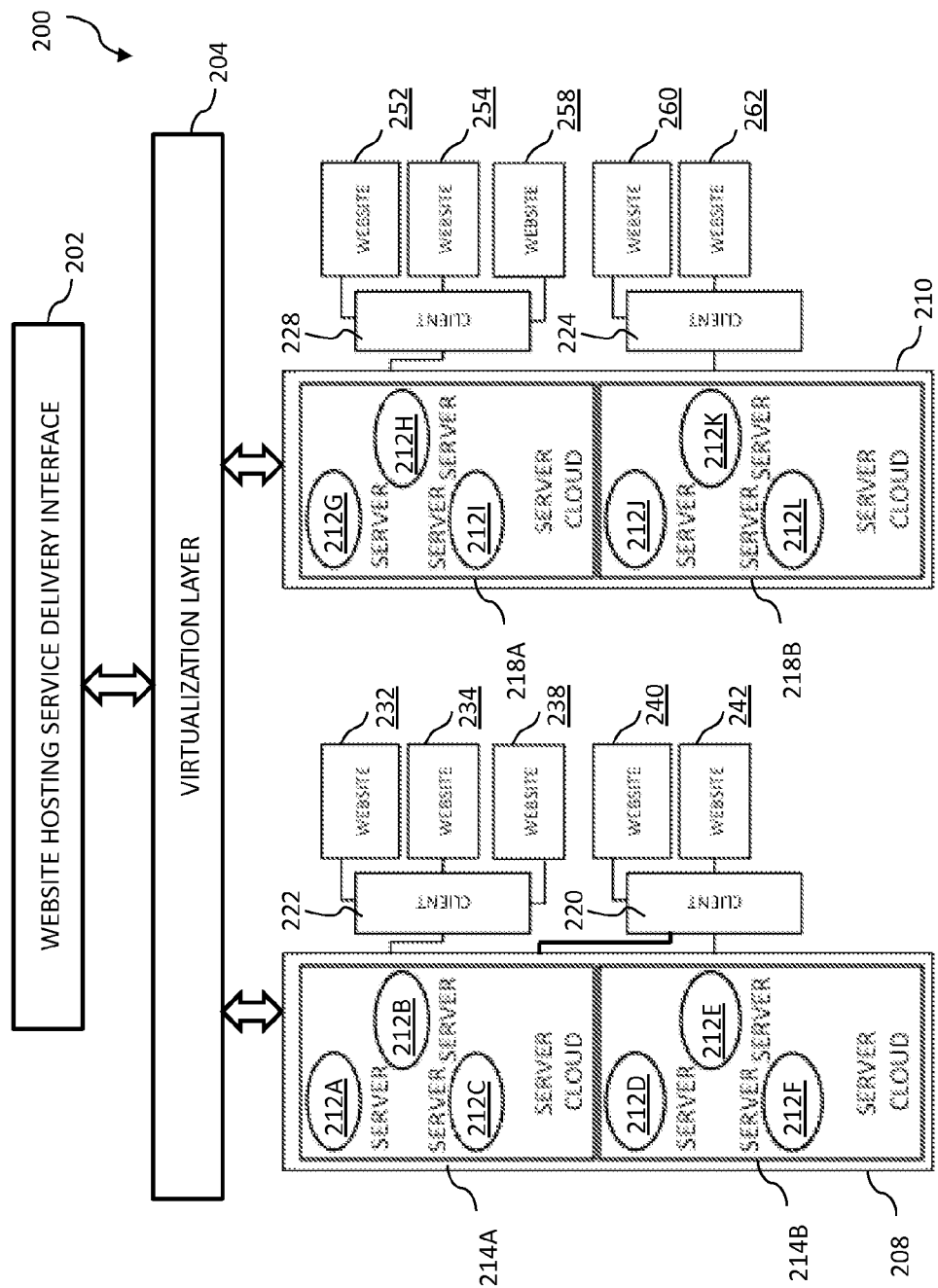
FIG. 2 depicts providing website hosting services via a virtualization layer from two distinct (not necessarily different but distinct) website hosting architectures.

FIG. 2 illustrates an exemplary embodiment of an architecture 200 providing website hosting services via a virtualization layer from two distinct (not necessarily different but distinct) website hosting architectures. The architecture 200 may be configured to include a website hosting service delivery interface 202 that may be abstracted from the two distinct website hosting architectures through the virtualization layer 204 to deliver website hosting and web presence related services to the users. The two distinct website hosting architectures may be represented by a first cloud based website hosting architecture 208 and a second cloud based website hosting architecture 210.

The cloud based website hosting architectures 208 and 210 may independently provide website hosting and/or web presence services to their respective clients using one or more servers 212x that may be communicatively coupled to create one or more cloud servers. In an example, the one or more servers 212x may be logically grouped into service pools so that the cloud server may provide one of the common services. Alternatively, servers in the cloud based website hosting architectures 208 and 210 may be configured as virtual servers, wherein a plurality of virtual servers on one physical server may be organized into a service pool as described herein. As illustrated in FIG. 2, the first cloud based website hosting architecture 208 may utilize a cloud server 214A and a cloud server 214B to deliver cloud based website hosting services to the clients. Similarly, the second cloud based website hosting architecture may utilize a cloud server 218A and a cloud server 218B to deliver cloud based website hosting services to the clients.

In the example of FIG. 2, the websites owned by the client 222 may include exemplary websites as website 232, website 234, and website 238 that may require fifty chat accounts and FTP services for the website 232, five hundred email address accounts and HTTP services for the website 234, and a thousand user chat account service for the website 238. Accordingly, the server cloud 214A may provide the necessary services for the client 222. Similarly, the server cloud 214B may provide the necessary services for websites owned by a client 220, such as website 240 that may require a one-thousand transaction per day service, and website 242 that may require video upload and download/streaming services. Further, the server cloud 218A may provide services to the client 228 for exemplary websites such as a website 252, website 254, and website 258 and the server cloud 218B may provide services to the client 224 for exemplary websites such as a website 260, and a website 262.

The virtualization layer 204 may be configured to abstract the delivery of website hosting service and/or web presence related services from the underlying architectures of the first and second cloud based website hosting architectures. Any services that may be offered by these distinct cloud based architectures may be accessed through the website hosting service delivery interface 202. In an example, a particular website may submit a request for an email service and storage services to the website hosting service delivery interface 202 which in turn may transfer the request to the virtualization layer 204. The virtualization layer 204 may identify the first cloud based website hosting architecture 208 for providing the email services to the particular website and the second cloud based website hosting architecture 210 for providing the storage services to the particular website. A client owning this particular website may not need to customize the applications to access these services just because the requested services are delivered from two distinct computing architectures. The virtualization layer 204 may provide the clients an abstraction layer from the underlying architectures and provide flexibility to the clients. In addition, the virtualization layer 204 may manage cloud resources and services, including service enrollment, provisioning, coordination, monitoring, scheduling, starting or stopping virtual machines, managing cloud storage, installing and deploying software on virtual machines, setting of web servers or any other such service and thereby abstract the service delivery from the cloud based website hosting architectures.

Figure 3:
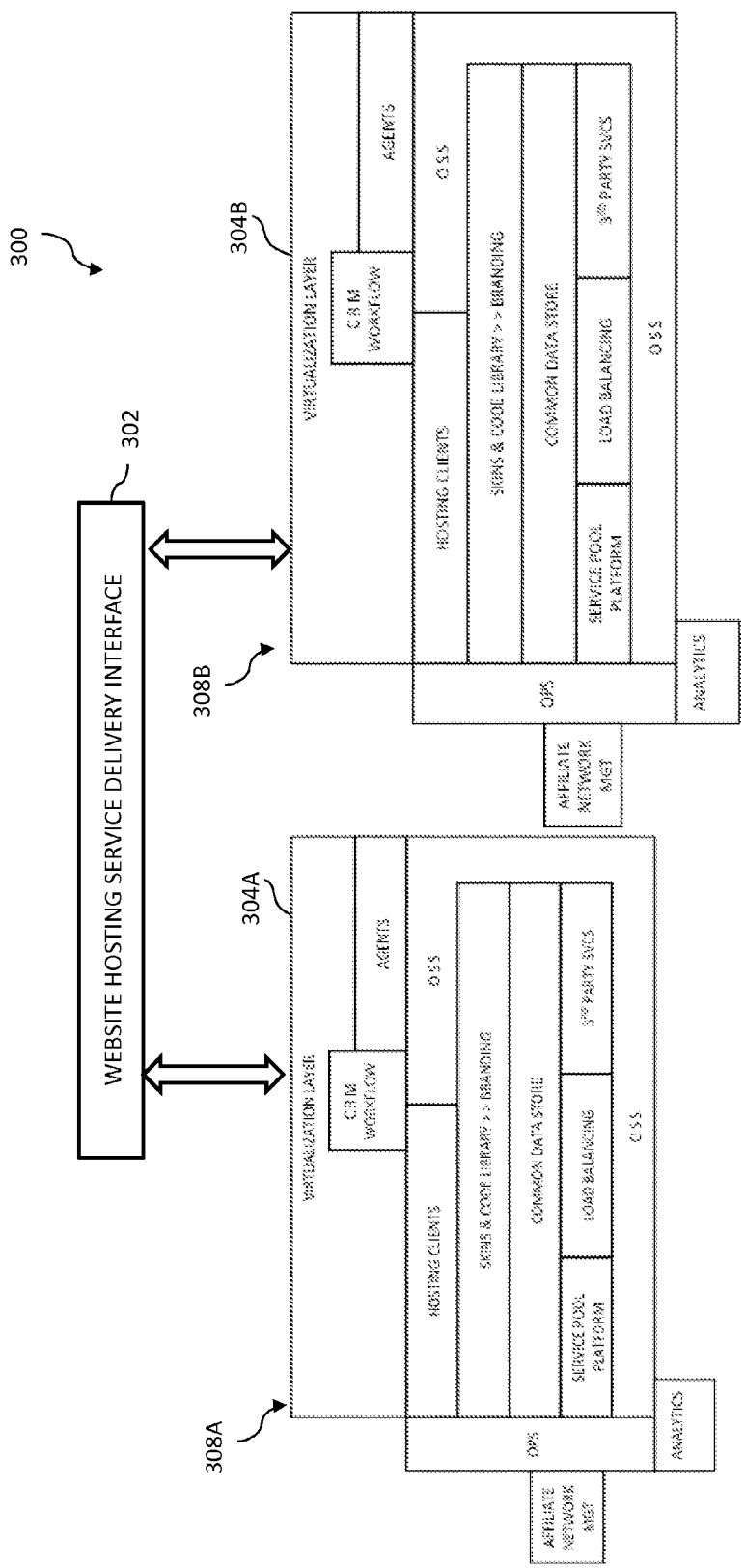
FIG. 3 depicts providing website hosting services via separate virtualization layers for two website hosting architectures.

FIG. 3 illustrates an exemplary embodiment of an architecture 300 providing website hosting services via separate virtualization layers for two website hosting architectures. A website hosting service delivery interface 302 may be coupled to a virtualization layer 304A and a virtualization layer 304B to abstract the website hosting service delivery from the underlying website hosting architectures. As illustrated in FIG. 3, the virtualization layer 304A may abstract the website hosting service delivery interface 302 from a first shared environment 308A and the virtualization layer 304B may abstract the website hosting service delivery interface 302 from a second shared environment 308B. An identical or functionally similar element is indicated by similar reference number. That is to say, the virtualization layer 304A and the virtualization layer 304B and similarly other group of elements, indicate functionally similar elements. Both virtualization layers may be referred to herein as virtualization layer 304.

FIG. 3 further illustrates that the two shared environment may be represented as common service architectures (e.g., 308A and 308B) and the virtualization layer 304 may abstracts the service delivery from the two distinct common service architectures. The common service architecture may be configured to include an open support system(s) (OSS) as a layer that may connect to all aspects of the common service architecture 308. The virtualization layer 304 (i.e., the virtualization layer 304A and the virtualization layer 304B) may be configured to be deployed as a top layer on various layers of the common service architecture 308. The virtualization layer 304 may provide communication means for the website hosting service delivery interface 302 to interact with the common service architecture 308. The virtualization layer 304A and 304B may abstract the corresponding common service architecture 308A and common service architecture 308B from the delivery of the services that may be delivered using the website hosting service delivery interface 302.

The virtualization layer 304 may receive request for delivery of the services from the website hosting service delivery interface 302 and may interact with the one or more agents 310 to access the resources available in the corresponding common service architecture 308. The agents 310 may access shared storage and the common services through an OSS 312 that may provide functionalities, such as an initial layer of security, server group load balancing, server group access management through distribution of access requests to service pools and/or individual servers, and the like. Through this comprehensive association at the client level, affiliate level, business operation level, physical server pool and data storage level, the agent 310 may be configured to utilize the OSS 312 to provide client support to confidentially access any aspect of the common service architecture 308 to provide the service. In an example, the client who has a support question about data security may be serviced by the agent 310 who may access the shared storage as a database manager in order to check database security features and settings for both the physical data storage and the logical data storage associated with the client. Many other such examples of how the OSS 312 may allow the agent 310 to service a client from both the client level interface to the platform and the low level "bottom-up" view of the platform are possible.

Therefore, the OSS 312 layer may allow the agent 310 to access secure and non-secure aspects of the platform. The OSS 312 layer may allow the agent 310 to access the platform like a hosting client 314. Alternatively, the OSS 312 may allow the agent 310 to access the platform independent of the hosting client views or limitations. The OSS 312 layer may also be connected to CRM workflows 318. The client information aggregated from a CRM database may be analyzed by the OSS 312 for creating better client management metrics. In this aspect, various services associated with the OSS 312 namely business management, network management, service management, and the like may be utilized alone or in combination with the CRM for better client management.

Further, the OSS 312 may be coupled to the skins and the code library 320. The skins and the code library 320 may facilitate maintaining a look and feel throughout a client's overall web hosting experience. In this aspect, the administrator of the web hosting platform may integrate the skins and the code library 320 based on the subscription plan. In an embodiment, the OSS 312 may allow the administrator to append look and feel components into the web site on request. The OSS 312 may facilitate management of third-party services 322 that may be coupled to the platform through the cloud, accessing a shared storage for retrieving client information, and for accomplishing requests by business management, service management, network management, and the like. In an example, the third-party services 322 may include payment gateway, advertisement engine, email services, ecommerce facilities, and the like. The capabilities of the OSS 312 may facilitate identifying peak traffic and usage for a web hosting client and thereafter, may facilitate initiating actions for handling an increase in peak traffic, such as by increasing the scalability of the service pools, by activating a set of additional servers, or by operating the service pool at higher utilization levels. Further, in an embodiment of the invention, the OSS 312 may be coupled to the load balancer 324. The load balancer 324 may receive requests from the OSS 312 agent 310s that need to be communicated to a particular services pool. Depending on the implementation of the OSS 312, such a request may appear to the load balancer 324 as being received directly from the cloud computing environment.

Further, the OSS 312 may be coupled to business operations 328. The business operations 328 may be further associated with an analytics facility and an affiliate network 330. The business operations 328 may include migration of web service from a traditional platform to the common service architecture; monitoring of web traffic, access control, billing, configuration of public and private IP address, bandwidth measurement; and integration of third-party services such as payment gateways and the like. Further, the aggregated data collected from one or more of these services may be analyzed at the analytics facility 330 for assessing the performance of the web hosting platform or one or more services associated with it. Similarly, the affiliate network 332 may be integrated with the business operations 328 for providing advertisement in the web pages and for generating revenues.

The OSS 312 may further be coupled to the analytics facility 330. The analytics facility 330 may provide statistical data about the user traffic analysis. The analysis may include the traffic growth, the source of the traffic, information about viewing pattern and loyalty, popular landing and exiting page, and the like.

The OSS 312 may further be coupled to the affiliate network 332. The affiliate network 332 may act as an intermediary between website publisher and merchants. Affiliate networks may provide links and banners, program sign-up sheets, payment services, and sales tracking. The affiliate network 332 may provide a program in which the publisher of a website may receive a portion of income for generating leads, traffic, or sales to a merchant website. The publisher may sign up for an affiliate program in order to make more money and may do so by placing banner or text links on their website.

By providing a separate virtualization layer 304A and 304B for abstracting service delivery from an underlying website hosting architecture, a virtualization-enabled platform as described herein may allow access to distinct services from the two distinct website hosting architectures for a single website. In an example, a first website service from a first website hosting architecture (e.g. an email service from the common service architecture 308A) and a second service from a second website hosting architecture (e.g. a video streaming service from the common website services architecture 308B) may be provided to a single website via the separate virtualization layers using the website hosting architecture virtualization techniques described herein. Virtualization may abstract management and delivery of the first and the second website services delivered using the corresponding first and second website hosting architectures and facilitate delivery of these services from the single website to the client without requiring any updating of the user interface therein. The user may not be aware that the services (that are accessed from the single website) are delivered from the distinct computing architectures.

In addition, the separate virtualization layers may facilitate isolation of the resources of two different architectures that may be accessed while delivery of the services to the clients. The isolation of the resources for services delivered using distinct computing architectures may enhance the flexibility of the virtualization enabled platform.

Figure 4:
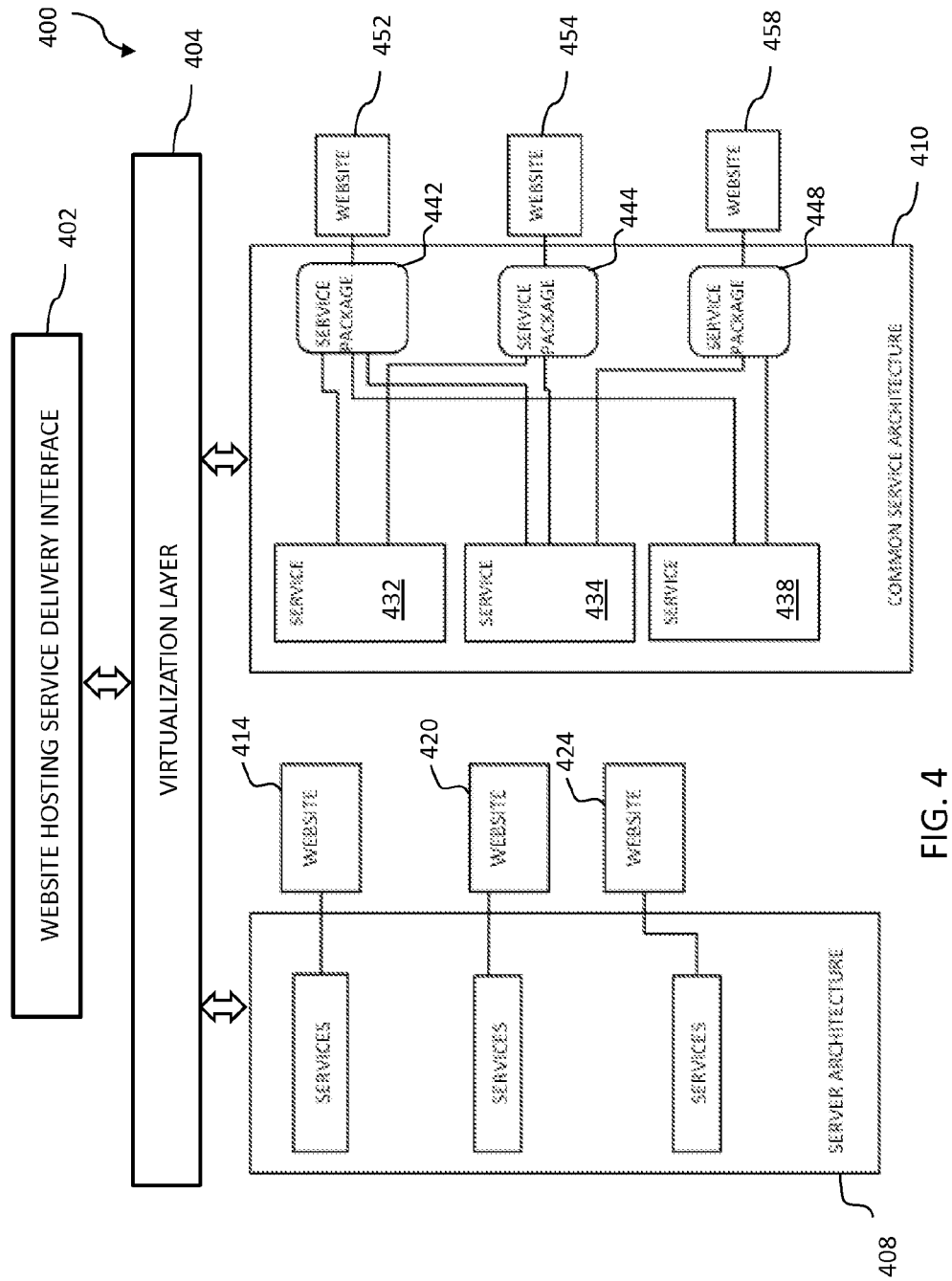
FIG. 4 depicts providing website hosting services via a virtualization layer from two different website hosting architectures.

FIG. 4 illustrates an exemplary embodiment of an architecture 400 providing website hosting services via a virtualization layer from two different website hosting architectures. A website hosting service delivery interface 402 may be coupled to a virtualization layer 404 to abstract the website hosting service delivery interface 402 from the underlying architectures. As illustrated in FIG. 4, the virtualization layer 404 may abstract the website hosting service delivery interface 402 from single server architecture 408 and from a shared environment that may be represented as a common service architecture 410 as described herein.

The server architecture 408 may serve a plurality of services dedicated exclusively to a specific website. Exemplary services served by the single server architecture 408 may include an email service 412, which may be dedicated exclusively to a website 414. Similarly, an email service 418 may be dedicated exclusively to website 420. Further, an HTTP service 422 may be dedicated exclusively to website 424.

The common service architecture 410 may serve a plurality of common services for a plurality of unrelated/unaffiliated websites as described herein. Exemplary services offered by the common server architecture 410 may include an HTML service 432, an email service 434 and a chat service 438. The plurality of services of the common service architecture 410 may adapt one or more services for a specific website based on terms of the subscription agreed to by a web hosting client. The one or more adapted services may be packaged into a service package. Exemplary service packages may include service package 442 that offers an HTML and a two email address service package for a website 452, service package 444 that offers an HTML, a twenty email address for a website 454, and a 1 member chat service package, and service package 448 that offers a five hundred email address and a five member chat service package for a website 458.

Methods and systems disclosed herein may enable the abstraction of these architectures from the website hosting service delivery interface 400 using the virtualization techniques described herein. The architecture 400 may implement the virtualization layer 404 to facilitate delivery of services (e.g., web page code access, email service, conference service, calendar service, e-commerce service, exchange service, databases, and the like) by abstracting the service delivery architecture of the abovementioned architectures from the users. That is to say, user may be provided the website hosting service delivery interface 400 to select the services that may be provided on his/her websites and user may not be aware of the underlying architectures of the platform that may be used for delivering user selected services. The virtualization layer 404 may act as a common interface to the website hosting service delivery interface 402 to provide services from different architectures. In an example, the services that were dedicated to a specific website in the server architecture 408 and/or service that were provided by the common service architecture using the service pools, service packages, and the like may be provided in combination to the users through the website hosting service delivery interface 402 using the virtualization layer 404 implemented using the virtualization techniques as described herein.

The virtualization layer 404 abstracts the underlying architectures of the service delivery and may provide benefits to the users by providing a single access to the users for these distinct architectures through the website hosting service delivery interface 402. A first service (e.g., a video conferencing service) and a second service (e.g., an email service) for a specific website may be accessed using the server architecture 408. In a scenario, when the user may need to utilize the video conferencing service using the common service architecture 410 to take advantage of features such as service pools and shared data store offered by the common service architecture 410, the present methods and systems enable the user to access the first service i.e., the videoconferencing service from the common service architecture 410 and still using the server architecture 408 for the second service. The virtualization layer 404 of the system 400 may enable the users to utilize different architectures for different services using a single website hosting service delivery interface 402.

The virtualization layer 404 may be configured to provide an automatic selection of hosting architecture from the server architecture 408 and the common service architecture 410 The user may merely access the website hosting service delivery interface 404 to select a specific service and the virtualization layer 404 may automatically communicate with a particular underlying architecture to provide an access to the specific service using the particular underlying architecture. The virtualization layer 404 may be configured to include various functions, codes and/or programming instructions that may automatically transfer the request for a specific service to the corresponding architecture from the plurality of the distinct architectures. The selection of the particular server architecture may depend on the type or category of the data, applications, and/or the services that may be required by the user.

The virtualization layer 404 may be configured to include programming instructions for facilitating delivery of a specific request for a service that may utilize resources from both the architectures. The specific request for a service may include providing video streaming using the data storage of the server architecture 408 and the shared storage of the common service architecture 410. In this example, data in the web hosting account at the server architecture 408 may be formatted differently than data in the shared storage of the common service architecture 410. The virtualization layer 404 include programming instructions to reformat or apply format conversion such as to facilitate delivery of the video streaming of the multimedia data spread across two different hosting architectures. Thus virtualization layer 404 may facilitate the delivery of the services independent of the underlying hosting architectures to provide a universal access to the users to a variety of services through the website hosting service delivery interface 402.

Figure 5:
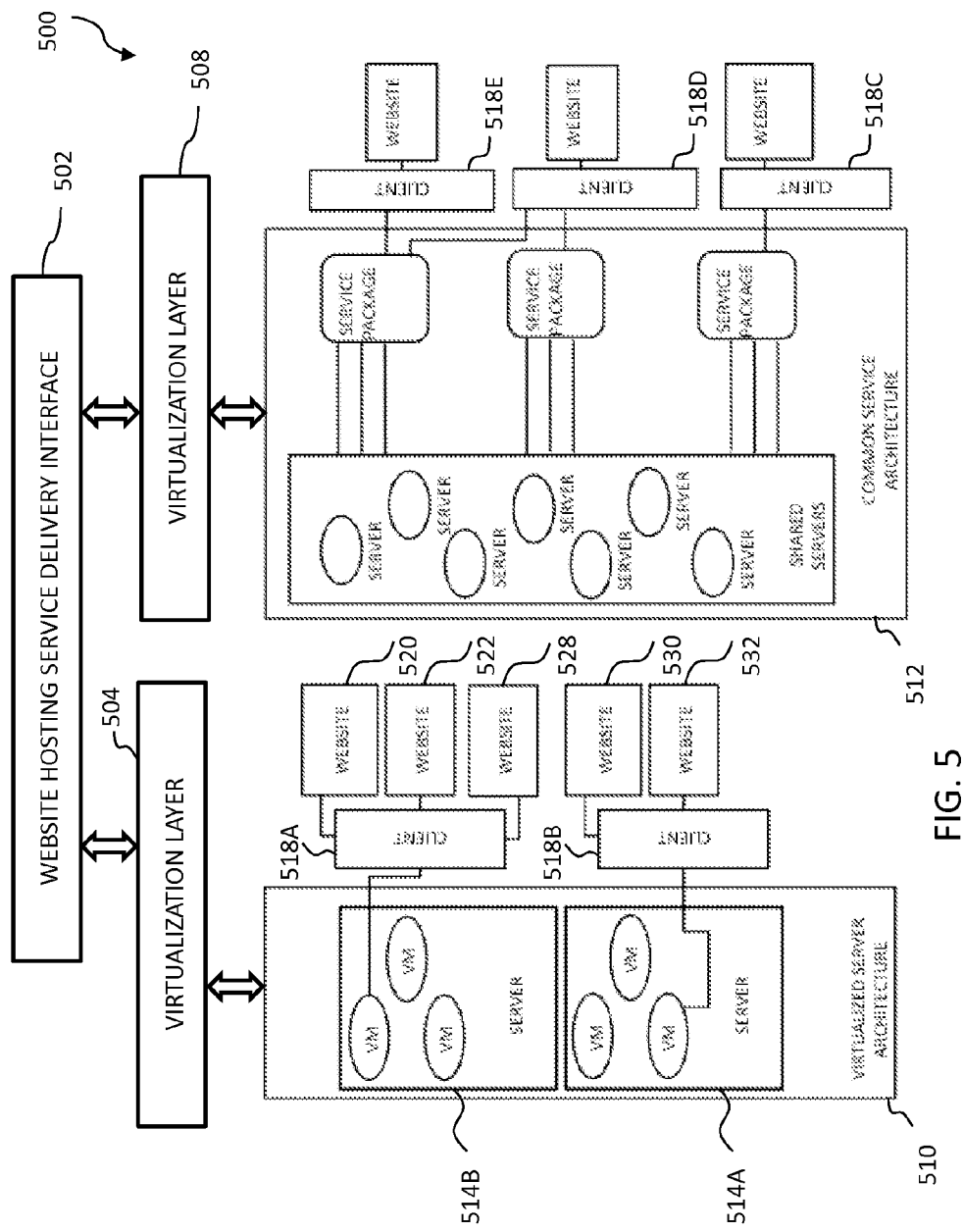
FIG. 5 depicts providing website hosting services via separate virtualization layers for two different website hosting architectures.

FIG. 5 illustrates an exemplary embodiment of a system 500 providing website hosting services via separate virtualization layers for two different website hosting architectures. A website hosting service delivery interface 502 may be coupled to a virtualization layer 504 and a virtualization layer 508 to abstract the website hosting service delivery from the underlying architectures. As illustrated in FIG. 5, the virtualization layer 504 may abstract the website hosting service delivery interface 502 from virtualized server architecture 510 and the virtualization layer 508 may abstract the website hosting service delivery interface 502 from a shared environment that may be represented as a common service architecture 512 as described herein.

The virtualized server architecture 510 may be configured to serve services necessary for a client's websites from a specific virtual machine (VM). The dedicated virtual machine may be embodied as software on a server and may be capable of serving all the services required by the website. The virtualized server architecture 510 may include physical servers 514 (e.g., 514A and 514B) that may be configured to install a plurality of virtual machines to provide virtual server-based hosting to the client's websites. Virtual server web hosting may enable the web hosting provider to offer near dedicated server capabilities and performance without the costs of individually dedicated hardware. The virtualized server architecture 510 may hide physical characteristics of the web hosting platform from the web hosting client but may associate one web-hosting client to one virtual server (also referred as a container).

In the example of FIG. 5, the websites owned by the client 518A may include exemplary websites as a website 520, a website 522, and website 528 that may require fifty chat accounts and FTP services for the website 520, five hundred email address accounts and HTTP services for the website 522, and a thousand user chat account service for the website 528. Accordingly, the server 514B may provide a dedicated virtual machine for necessary services to the client 518A. Similarly, the server 514A may provide the necessary services for websites owned by a client 518B, such as website 530 that may require a one-thousand transaction per day service, and website 532 that may require video upload and download/streaming services.

The common service architecture 512 may be configured as a cloud computing environment. In the cloud computing configuration, the shared servers 514 may broadly represent a plurality of shared resources, software, and information that may be utilized by the websites. A server may be shared among the websites on demand. The cloud computing configuration may enable provision of the services from the common service architecture 512 in the form of web-based tools or applications that web hosting clients or users of the hosted websites may access and use through a program (e.g. a web browser).

The common service architecture 512 may be a grid computing environment. In the grid computing configuration, multiple unrelated/unaffiliated websites may share computing infrastructure provided by the shared servers 514 that may provide a flexible, power efficient, and scalable solution for a website. The servers in the grid may be pooled and provisioned to the websites on demand. Further, the grid computing configuration may increase the physical resources when required.

The common service architecture 512 may include a plurality of common service pools disposed across a plurality of servers. The plurality of service pools may provide the plurality of services to the websites. The service pools may include one or more web servers. The service pools may be logically grouped on the basis of service offerings. The service pools may include one or more service-specific groups of web servers for providing various services such as, but not limited to, email, HTML services, website generation, behavior tracking, transactional services, data access (e.g. FTP), media streaming, e-commerce, and the like. The service groups may consist of servers that provide one of the services provided by the common service architecture 512. In an example, the dedicated virtual server based virtualized architecture 510 may have different user interface requirements than the shared server based common service architecture 512, due to the differences in the operating principles of the underlying architecture. However, the users or clients of the website hosting services may not desire or require being aware of the operational differences of the underlying architectures, they may only want flexible, reliable and efficient delivery of service. In the example of FIG. 5, separate virtualization layers implemented over each of the at least two distinct website hosting service architectures abstract the website hosting service delivery from the two distinct website hosting service architectures discussed above. Thus, the separate virtualization layers (i.e., 504 and 508) provide flexibility to the clients of this virtualization enabled platform such that clients from either of the two architectures may be able to avail website hosting services flexibly without facing any architecture specific limitations in the service delivery.

Figure 6:
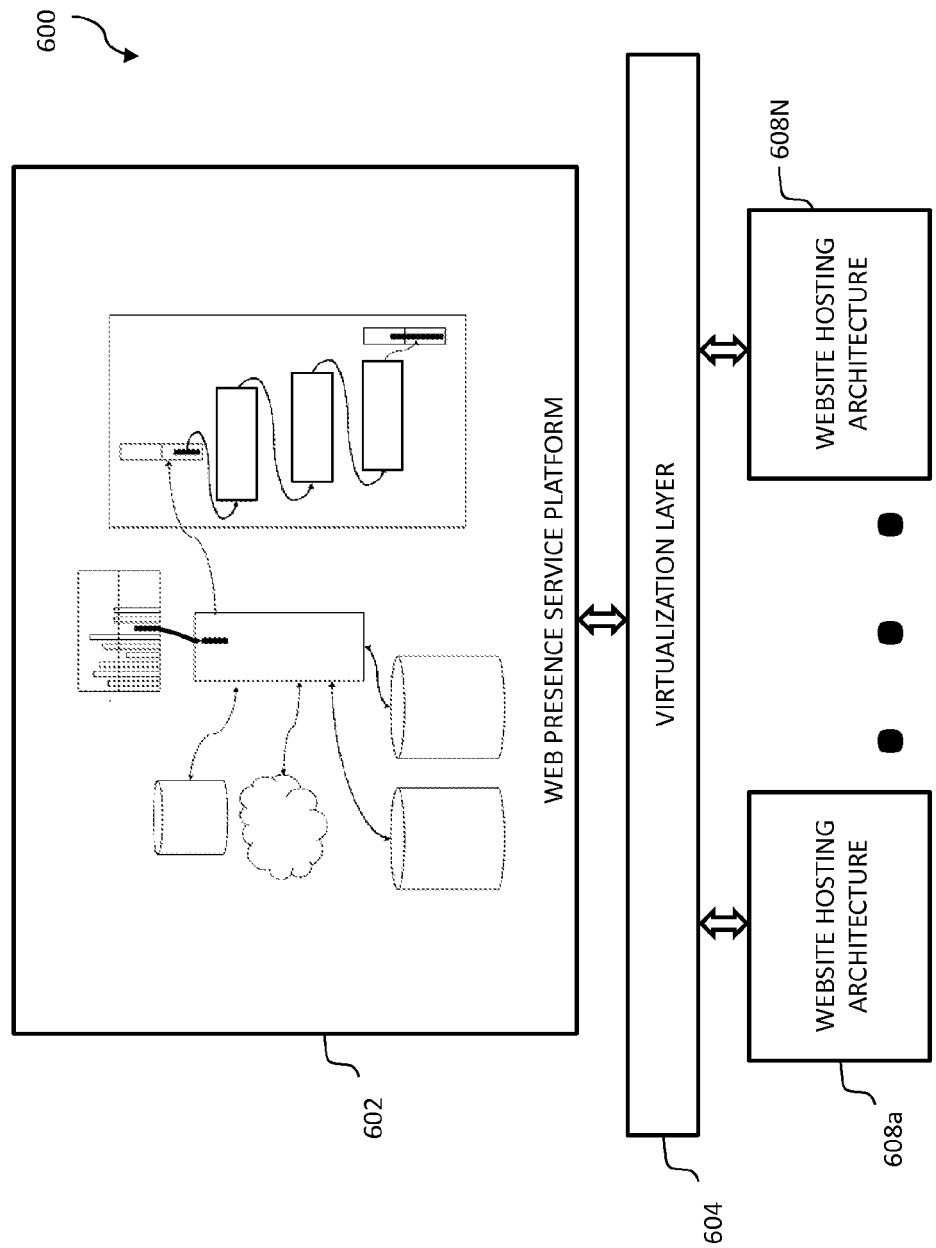
FIG. 6 depicts an architecture configured to include a web presence service platform for providing web presence services via a virtualization layer from a plurality of website hosting architectures.

FIG. 6 illustrates an exemplary embodiment of an architecture 600 configured to include a web presence service platform for providing web presence services via a virtualization layer from a plurality of website hosting architectures. The web presence service platform 602 may be abstracted from the plurality of website hosting architectures through the virtualization layer 604 to deliver website hosting and web presence related services to the users. As illustrated in FIG. 6, the plurality of different website hosting architectures may be represented as a website hosting architecture 608a through a website hosting architecture 608n. An implementation of virtualization technology to abstract web presence service platform from two different website hosting architectures may further enhance flexibility because virtualization can abstract service delivery so that software stacks that provide website hosting service and web presence service delivery functionality and related capabilities may be deployed and redeployed without requiring any specific hosting architecture.

FIG. 6 further depicts an example of a user interface 612 for managing a customer's web presence, such as for establishing a web presence via a guided workflow in accordance with various embodiments of the present invention. Methods and systems to provide guided workflows to a customer are also depicted in and described in association with FIG. 6. The methods and systems may include the user interface 612 that may be configured to allow the customer to manage a customer web presence. In an example, a user interface 612 may allow a customer to manage a customer's web presence 618 based on operation of a logic engine 620 that accesses information about what the customer has done (e.g. current web presence 618) and who the customer is (e.g. customer data 624 that may include the customer's type of business). The user interface 612 may present a guided workflow of tasks associated with a recommended area of improvement for the customer. The recommended are of improvement may be related to an aspect of the customer's web presence.

A web presence 618 may include a variety of areas 614 that may be analyzed by a logic engine 620 to determine which area(s) 614 may be improved by applying a guided workflow 628. Determining one or more areas for improvement may be based on a variety of factors including a threshold associated with an area, a model of continuous or progressive improvement of a web presence, comparative ranking, area popularity, a measure of change already made to the area, and the like. In an example of threshold-based determination, each web presence area 614 may be compared to an improvement threshold 622 to determine which area(s) 614 exceed the threshold. These areas may be considered to be acceptable (or at least not necessarily in need of improvement) and therefore other areas that do not satisfy the threshold 622 may be further evaluated for improvement. In an example of a model of continuous or progressive improvement, areas of web presence and/or their impact on a user's web presence may be evaluated periodically or over a period of time so that the user's web presence can be improved by applying a series of improvement steps. A user's web presence may be evaluated for improvement based on its position in a ranked list, and the like. Successive improvement steps may include improving different web presence areas, determining a web presence area for improvement based on previous improvement steps, and the like. In an example of a determining a candidate are for improvement 630 based on a measure of change already made to an area, a record of improvement attempts to any area or a range of related areas may be consulted. If the record indicates that an area has been through an improvement cycle recently, further attempts at improvement in the area may be deferred to allow the improved area time to have an improving impact. In an example of comparative ranking, similar web presence areas from a plurality of users (e.g. similar users) and/or the improvement attempts made to those areas may be compared to compare the improvement efforts for a current user to the plurality of users. If several users had improvements in two different web presence areas, the area that resulted in the greatest improvement might be selected as a candidate area 630 for improvement. In another example of comparative ranking, areas of web presence may be grouped into related sets (e.g. communication, content, metadata, social networking, and the like) may be evaluated for determining the one or more for which the user needs most improvement, such as relative to others in the same industry. This might be based on a ranking of the customer's web presence to its peers. A set of areas in which the user is ranked lowest among peers may signify that improvement in one of the related areas in the set could be beneficial. In an example of area popularity-based determination, data regarding similar customers may be analyzed to determine which web presence areas are popular to help pinpoint one or more areas to improve. Areas that are least popular may not be as likely to improve a user's web presence as areas that are more popular.

For any given area 614 needing improvement, called a web presence improvement candidate 630, the logic engine 620 may evaluate a variety of data sources, analysis results, and the like to determine at least one recommended work flow 628 for improving the candidate 630. The logic engine 620 may access data such as user data 624 that may include information about a particular customer for whom a recommendation regarding an area of improvement may be prepared. The logic engine may also access customer data 624 for other customers, such as other customers for whom the logic engine 620 has provided web presence improvement workflows 628, and the like. The logic engine may access data representing any number of different customers to facilitate determining a workflow 628 for improving a candidate web presence area 630. Customer data 624 may include customer data for a variety of web hosting customers, including former web hosting customers. The logic engine 620 may be configured to access information about the customer including customer activities such as, for example, but not limited to, customer business, customer profile information, and the like to determine a recommended area of improvement 630 for the customer's web presence.

The logic engine 620 may further access a customer's current web presence 618 and information about the customer such as who the customer is market information about the customer, existing web presence areas, and the like. A customer's web presence may be supplemented with information about the customer that is accessible through Internet search engines and the like. Other sources may include industry directories, corporate registrations, government records, and the like. The logic engine may combine this customer web presence-related information with the customer information 624 when determining a recommended workflow 628 for improving a candidate web presence area 630.

A guided workflow 628 may be derived from a sequence of workflow tasks (1528A, 628B, 628C, etc.). The tasks and relationships among the tasks, such as which tasks must precede other tasks, and which tasks are candidates for executing subsequent to execution of a given task may be stored in a workflow task library 632 that may be accessible to the logic engine 620. The logic engine 620 may access the library 632 to select a task based on the improvement candidate area 630, the customer data 624, the current web presence 618 and other information. The logic engine 620 may use the task relationship information to identify candidate tasks and/or conditional tasks to be included in the guided workflow 628 to be presented on the user interface 612. The library 632 may have a variety of tasks that help on a particular area of web presence. Those tasks may be undertaken in more than one possible sequence, such that at any given point, a next task may be selected by the logic engine 620 that contributes to an improved web presence. The customer might complete all tasks presented in a guide workflow, or might just do one of the tasks, but in either case the result of executing the guided workflow is that the web presence should be improved. The logic engine may identify a next task based on a variety of factors including being based on where the customer is in the web presence improvement process. In an example, if the user has indicated a budget for improving web presence and the user has taken web presence improvement tasks in one or more guided workflows that substantially consume the entire available budget, the logic engine may present a low or no cost web presence improvement task. Alternatively, the logic engine may provide an indication of the use of the budget and give the user the opportunity to close out the web presence improvement process, increase the budget, or the like.

In an alternate embodiment, a guided workflow may be based on an amount of time that the user has available for improving web presence during a particular web presence improvement session. In an example, the customer may be asked about how much time is available so that tasks that can improve the user's web presence in a given amount of time are recommended. Further in the example, a user might have five minutes available, which might give enough time to add the customer's contact information to a page. If the user indicates that an hour might available, the logic engine may present web presence improvement tasks that enable setting up links among pages, creating search engine metadata, connecting to a social networking site, and the like.

A guided workflow 628 may also be based on criteria and templates of web presence objects/elements that may be stored in a web presence objects dataset 634. Web presence objects dataset 634 may also include information about web presence areas, improvement thresholds, and the like that may be used by the logic engine 620 to select web presence improvement area candidates 630.

The logic engine 620 may combine and analyze input from the various sources described herein to generate content and/or guidance for display and/or interactive presentation of a guided workflow on user interface 612. In an example, the logic engine 620 may determine a plurality of candidate areas of web presence improvement 630. The candidates 630 may be further filtered by reviewing customer data 624 (e.g. web hosting service level) and combining with an analysis of a user's current web presence 618 to determine at least one candidate area 630 for improvement. The selected area for improvement can be presented to the user through the user interface 612 along with at least one guided workflow 628 for improving the candidate web presence area 630. The guided workflow 628 may, when executed, result in an improvement in the candidate area 630 such that the area 630 is no longer below the improvement threshold 622.

As illustrated in FIG. 6, the services that may be delivered using the web presence service platform 602 are abstracted from the underlying website hosting architectures 608. The web presence service platform 602 may be configured to provide web presence services for websites that are hosted on at least two distinct website hosting architectures 608 using the virtualization layer 604 that may provide a pure or partial virtual network of a plurality of virtual machines, virtual servers, and the like. In particular, the virtualization layer 604 may facilitate the web presence service platform interfacing with the websites.

In an example, a web hosting service provider may offer the web presence services to attract new customers to the web hosting service by initiating contact with the potential new customer based on the new customer's interest in establishing or enhancing a web presence. The term "web presence" described herein may be defined as a persona, an identity, and/or a communication medium of the customer, as well as the underlying content, such as pages, URLs, email addresses, and the like, that embodies or creates the identity or persona. The web presence described herein may include at least one of the electronic communications medium such as email, video conferencing, electronic chatting, instant messaging, and the like; website, domains such as domain names, URLs, and similar indication of location and identity or persona; presence on social networking sites or communication streams such as Facebook or Twitter; and other web-related elements.

Virtualization may facilitate this contact by offering web presence services via the web presence service platform 602 independently of the website hosting architecture 608 being used for the website hosting services. In this example, a website hosting service aggregation facilitator may attract potential new website hosting customers for a variety of distinct website hosting providers, who use different website hosting service architectures, through a web presence platform 602 that focuses on web presence factors rather than on particular website hosting services or web site hosting services architecture factors. The web presence service platform 602 may present or deliver the web presence services to a plurality of unrelated or unaffiliated websites that are hosted by at least two distinct website hosting services architectures.

The website hosting services architectures may include two or more distinct services architectures from among a cloud computing architecture, a grid computing architecture, a virtual server computing architecture, a one box per website architecture, a one box per client architecture, a dedicated services per website architecture, and a common service platform architecture, and the like without limitations. A virtualization layer, similar to the virtualization layer discussed above in conjunction with a website services hosting platform 602, may be deployed on the web presence service platform to implement virtualization functionality to support use of multiple website hosting architectures. The virtualization layer may facilitate connecting to various aspects of two or more website hosting architectures in the virtual network of the web presence service platform.

Figure 7:
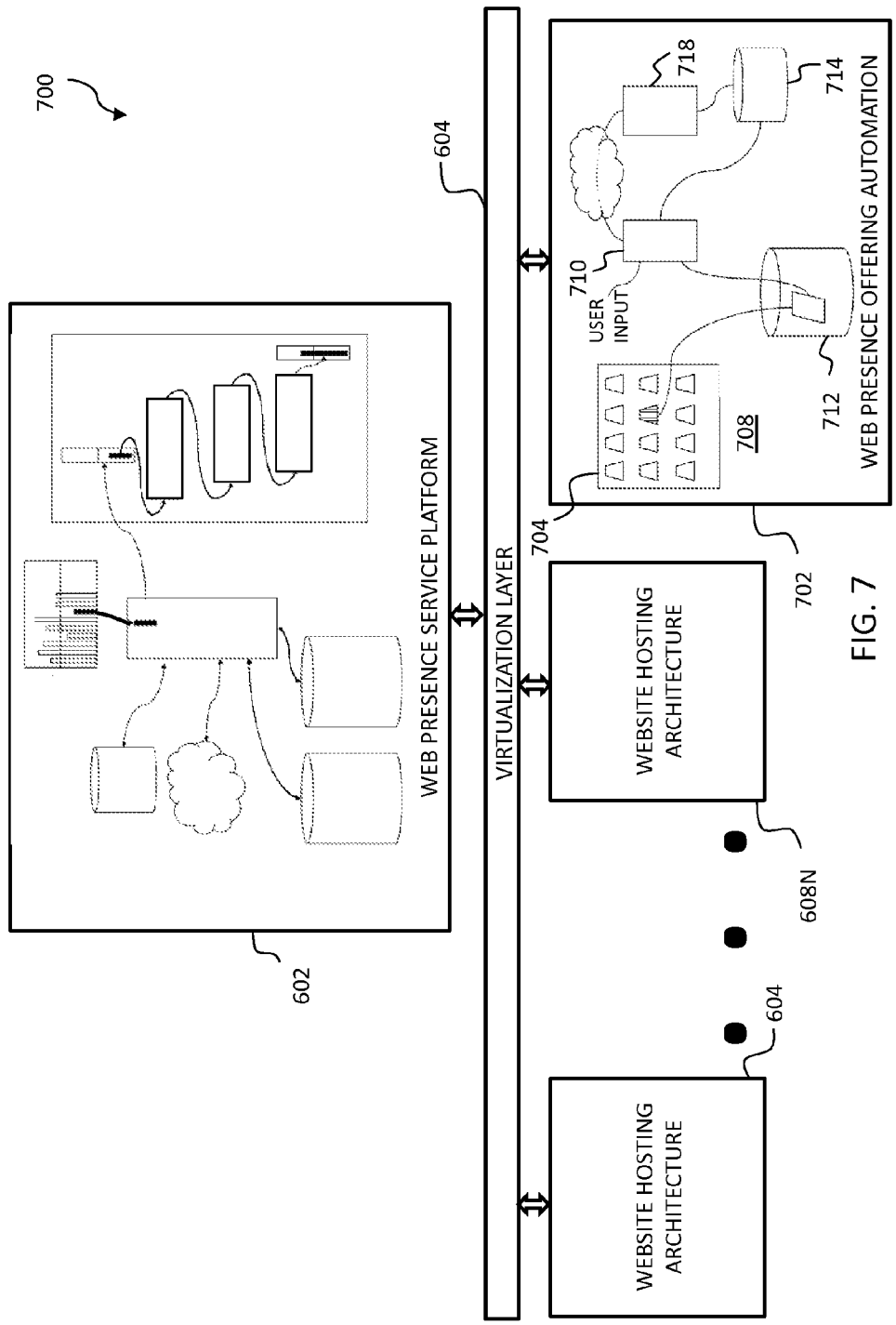
FIG. 7 depicts an architecture configured to include the web presence service platform 602 that delivers website hosting and web presence automation via the virtualization layer 604 that abstracts the service delivery from website hosting architectures and web presence automation.

FIG. 7 illustrates an exemplary embodiment of an architecture 700 configured to include the web presence service platform 602 that delivers website hosting and web presence automation via the virtualization layer 604 that abstracts the service delivery from website hosting architectures and web presence automation. FIG. 7 will be explained in conjunction with description of FIG. 6.

The web presence service platform 602 may be configured to deliver web presence as well as website hosting services to users by using a virtualization layer 604 abstracting the service delivery from a plurality of different website hosting architectures. This may offer greater flexibility, usability and variety to users who may desire to access both the website hosting as well as web presence services from the same platform 602. That is to say, the virtualization layer 604 may enable the users to access both these services from a single web presence service platform. This may offer cost saving and effective resource utilization to users, as the users might not need to spend additional resources and/or fee for acquiring additional services from a different platform or service provider.

As illustrated in FIG. 7, the virtualization layer 604 may abstract service delivery from a plurality of website hosting service architectures 608 and a web presence automation service architecture 702 that may include an application storefront embodiment of the script-based automatic application installation/deployment methods and systems. A user may consider a plurality of web presence/app offerings 704. The user may select a web presence feature 708 that may be recommended via an engagement engine. The selected web presence feature may direct a script server 710 to select the software, configuration information, and the like from a web presence app library 712 to install the user selected web feature. The script server 710 may configure the web presence software and the like and install it with the user's web presence files 714. As described herein, the script server 710 may connect and interact with a third party system 718, such as a web presence host, to enhance and extend the script-based capabilities to include recommending apps (e.g. with an engagement engine), facilitating installation of apps for clients of the third party, revenue sharing, upselling, and the like.

In an example, a client may desire to build a website for their business and at the same time avail web presence services automatically for effective marketing and analytics related to their business website. For example, a client may require to set-up a website for sale of electronic items and at the same time might require functionality in the website that enables buyers of electronic items on the website to be able to create and post comments on their blog about the electronic items. In this example, a user of the web presence service platform 602 may offer both these services to the client by making use of the virtualization enabled web presence service delivery platform. The virtualization enabled web presence service delivery platform 602 abstracts service delivery from website hosting architectures and web presence automation architectures, and offers both these services from a single layer to the users. Thus, while the client gets cost effective solutions for their business, the web presence platform 602 may be able to attract more clients and leverage the virtualization technology to increase their profits.

In an example, the virtualization layer 604 may enable users of the web presence service platform to access a plurality of features of the automated web presence service offering. The features may include but are not limited to, automated web presence enablement, a catalog of web presence features such as purchasing a domain name, transferring a domain name, purchasing web hosting, and generating a webpage, a photo gallery, a shopping cart, a survey tool or any other. Users may be able to access these features along with website hosting services from different underlying architectures of the website hosting and web presence automation services, without the user being aware of the heterogeneity of the underlying architectures. For example, a user who requests for a new website from the web presence service platform may be offered a web catalog of web presence services that may also be availed. Some exemplary web presence services have been discussed above. The user may provide their preferences from the web presence catalog. Based on user preference, web presence service platform 602 may automatically install user's web presence features during website installation. For this, the website hosting feature may be provided by the website hosting service architecture and web presence features may be provided by the web presence automated offering. The virtualization layer 604 may abstract the delivery of these services from different architectures and provides a unified view of services to the user of the web presence service platform.

Figure 8:
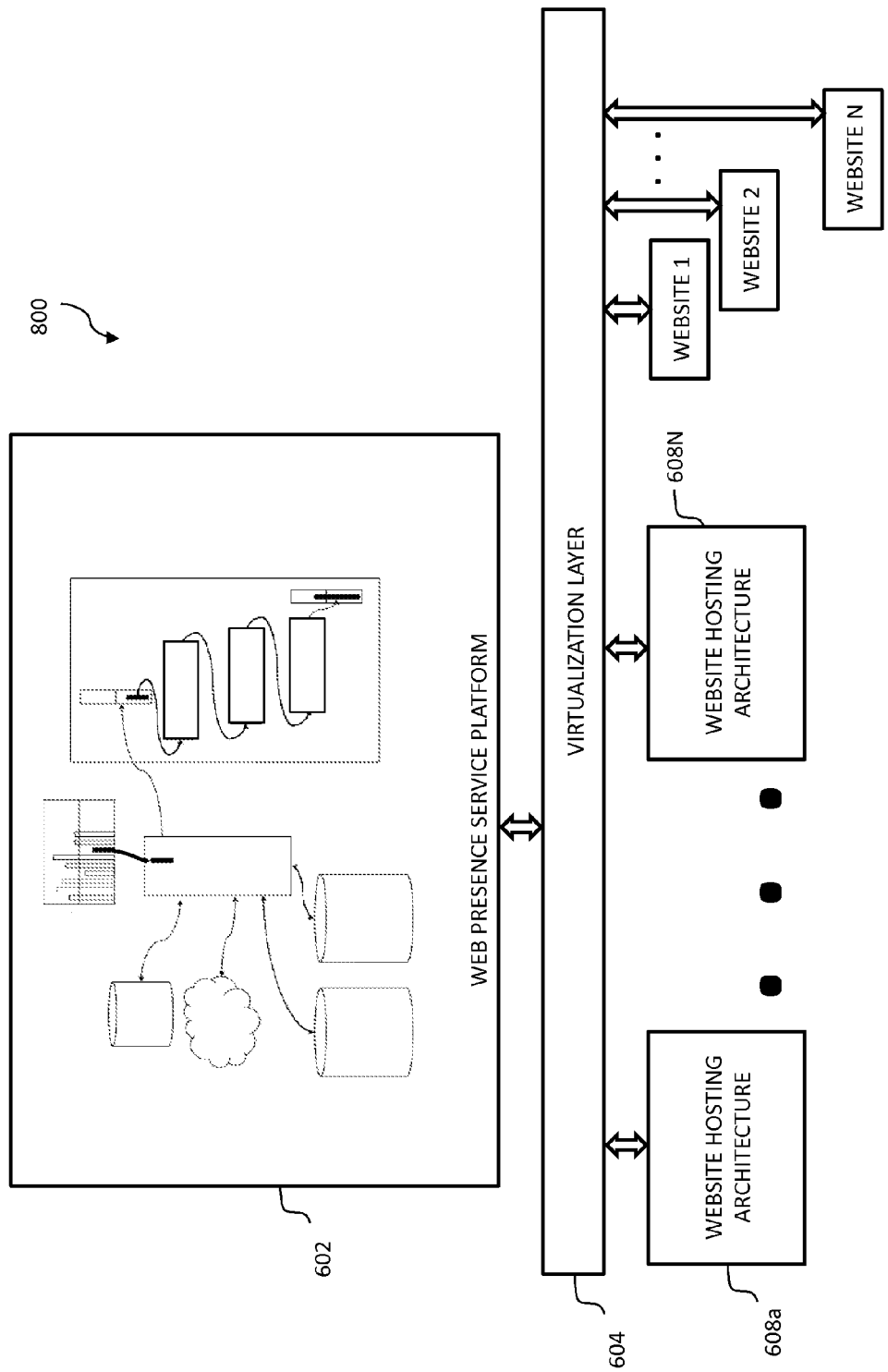
FIG. 8 depicts an architecture configured to include a web presence service platform that delivers website hosting and web presence services via a virtualization layer.

FIG. 8, illustrates an exemplary embodiment of an architecture 800 configured to include the web presence service platform 602 that delivers website hosting and web presence services via the virtualization layer 604 that abstracts the service delivery from website hosting architectures 608a to 608n and a plurality of unrelated websites (e.g., website 1 to website N). The distinct architectures may be any two or more of a cloud computing architecture, a grid computing architecture, a virtual server computing architecture, a one box per website architecture, a one box per client architecture, dedicated services per website architecture, and a common service platform architecture with or without service pools.

The plurality of distinct website hosting architectures 608 may be configured to deliver website hosting services to the plurality of unrelated websites through the use of the virtualization layer 604. This may enable the plurality of unrelated websites to leverage the benefits of virtualization such as flexibility, efficient resource utilization, resource isolation, usability and variety in the delivery of services to the users who may desire to access both the website hosting as well as web presence services from the same platform 602. In addition, the plurality of unrelated websites may be able to use the website hosting services from distinct website hosting architectures 608a to 608n.

In an example, a first website may access services from a first website hosting architecture 608a (e.g. an email service from a cloud-based website hosting architecture) and a second service from a second website hosting architecture 608b (e.g. a video streaming service from a common website services architecture) that may be provided to a single website via the virtualization layer 604 using the website hosting architecture virtualization techniques described herein. The virtualization layer 604 may abstract management and delivery of the first and the second website services delivered using the corresponding first and second website hosting architectures (i.e., 608a and 608b) and facilitate delivery of these services from the single website to the client without requiring any updating of the user interface therein. The client may not be aware that the services delivered by the first website are delivered from the distinct computing architectures. Further, the client may access some additional services from a second unrelated website that may also use the virtualization layer 604 in a similar manner to provide services from distinct website hosting architectures. For example, the second website may provide a chat service to the client from a third website hosting architecture 608*c* (e.g., a virtual server architecture) and may provide a business intelligence related service from a fourth website hosting architecture 608*d* (e.g., a grid computing architecture). Thus, the client may be able to access a plurality of services from a plurality of hosting architectures offering efficient resource utilization along with diversity of service delivery.

In another example, each of the plurality of unrelated websites may be hosted by more than one website hosting architectures 608 such that requests of the website hosting services from a website out of the plurality of unrelated websites may be directed to one or more hosting services architectures based on several parameters such as type of the services, space requirement for the services, a client, and the like. Any one of the plurality of services or any one of the services architectures in the virtual network may be configured to be deployed to serve any one of the plurality of unrelated websites. The each of the plurality of services may be adapted to contribute to a distinct package of services for at least a plurality of unrelated websites.

The website hosting platform may use the virtualization layer 604 and/or virtualization capabilities as described herein to provide a website hosting service or a service package to the plurality of unrelated websites from any of the hosting services architectures or a combination thereof from the distinct architectures to meet the website service requirements of the plurality of unrelated websites. Further, the website hosting and web presence platform 602 may be configured such that any of the virtual servers or a group of servers in the virtual network may serve any one or a group of websites from the plurality of unrelated websites. A package of services or a service package may be created that addresses specific needs, preferences, contractual requirements, subscription policies, and the like of a hosted website. In an aspect, each of the two or more architectures in the website hosting and web presence platform 602 may provide a different package of services to at least a plurality of the unrelated websites. Exemplary packages of services may include without limitations a service package that may package a three email address service and an HTML service, a service package that may package a two hundred email address service, and a service package that may package one thousand email address service and a one thousand member chat service. Each distinct package may be associated with only one website of the plurality of unrelated websites, in an aspect. In another aspect, a package of services may be subscribed to by one or more websites.

Figure 9:
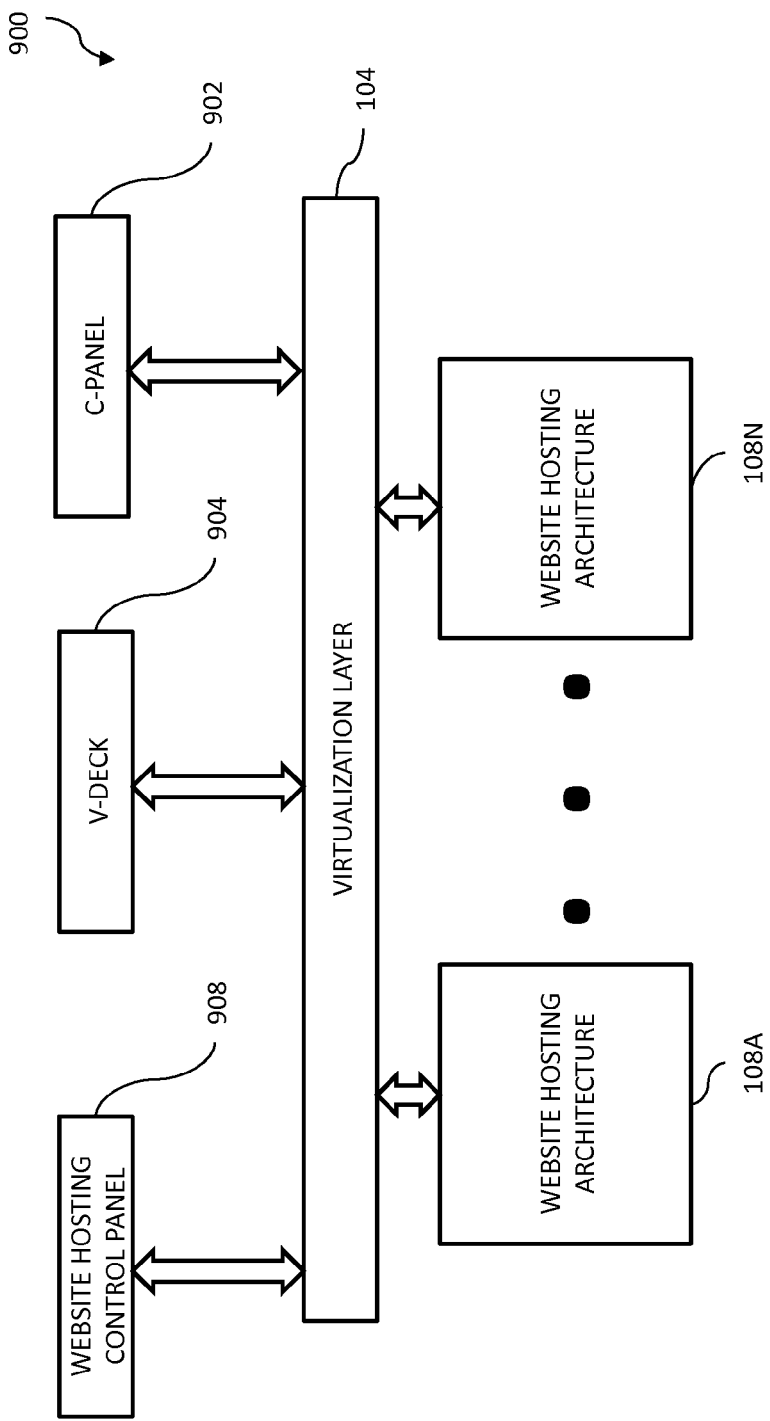
FIG. 9 depicts a diagram of a plurality of website hosting panels abstracted from various underlying hardware architecture for hosting websites by a virtualization layer.

Referring to FIG. 9, which depicts a diagram of a plurality of website hosting control panels abstracted from various underlying hardware architectures for hosting websites by a virtualization layer, distinct control panels may be used to access various underlying website hosting architectures without requiring a dedicated connection between a type of control panel and a type of website hosting architecture. While control panels such as V-DECK 904 are commonly known for working with a variety of website hosting architectures, C-PANEL 902 is commonly known to work primarily with either a dedicated server or virtual private server architectures. The virtualization layer may enable a consolidated website hosting and service solution that supports flexibility in choice of control panel while providing access to the bountiful and flexible functionality offered by website computing architectures, such as a cloud computing architecture, a grid computing architecture, a virtual server computing architecture, a one box per website architecture, a one box per client architecture, a dedicated services per website architecture, and a common service platform architecture with or without service pools. Each underlying hosting architecture, such as architecture 108A through 108N may, via the virtualization layer, support any website hosting control panel. Website hosting architectures 108A through 108N may be the same architectures, different architectures, a plurality of instances of virtual architectures provided by a cloud-based solution via the virtualization layer, and the like. In an example, website hosting architecture 108A may be a common services architecture and a website provider may elect to offer C-PANEL as a website control panel to the provider's website clients. Through the use of virtualization, these potentially incompatible website-related resources may co-exist within a consolidated website hosting architecture. In another example, C-PANEL may be used by website owners to manage websites that are hosted by a cloud-based hosting architecture without the C-PANEL application or the website owners having or needing any concrete knowledge about the hardware resources being used within the cloud to provide a website hosting architecture.

Figure 10:
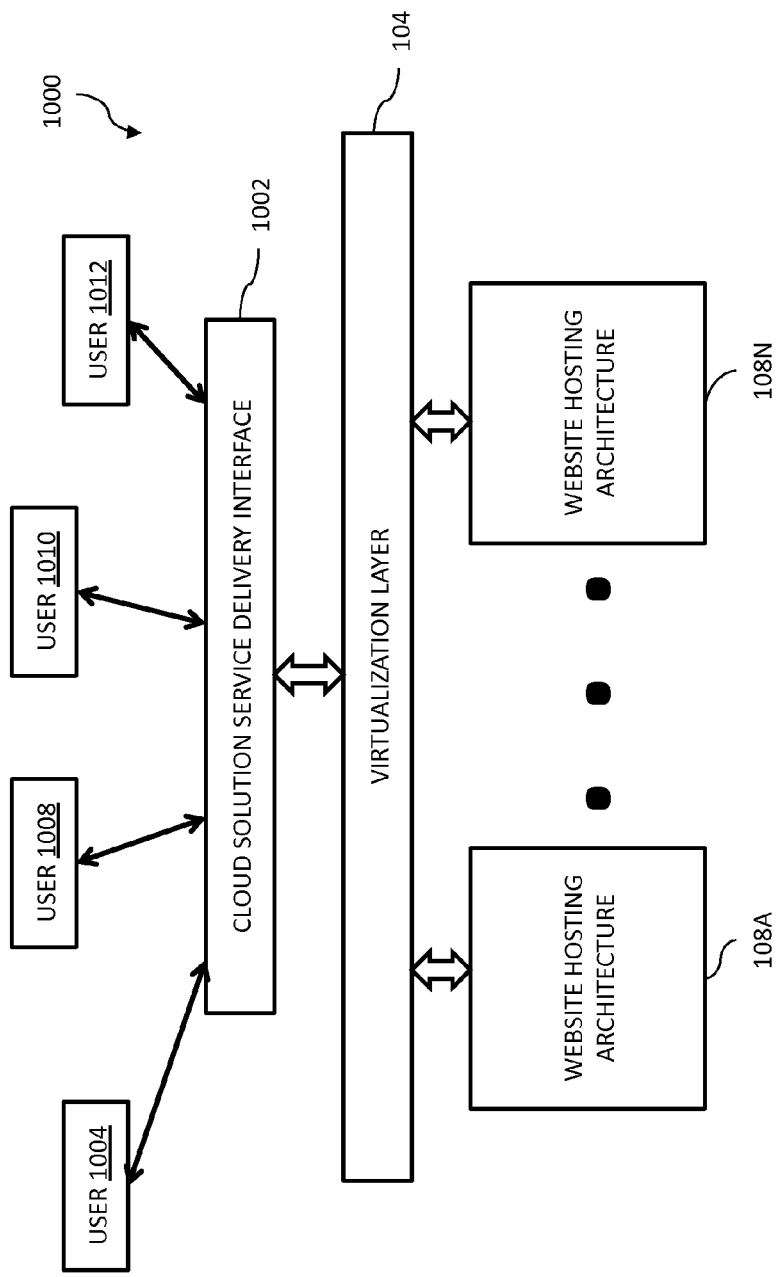
FIG. 10 depicts a cloud solution service delivery interface that serves cloud solutions to users and is abstracted from underlying hardware architecture for hosting websites via a virtualization layer.

Referring to FIG. 10, which depicts a cloud solution service delivery interface that serves cloud solutions to users and is abstracted from underlying website hosting architectures via a virtualization layer, users may benefit from a comprehensive cloud solution delivery service. Unlike conventional cloud offerings that require knowledge of computing system architectures and the like to effectively configure and maintain a cloud-based computing and/or data storage presence, a cloud solution service delivery interface 1002 in combination with virtualization layer 104 may facilitate abstracting user's requirements, functionality (e.g. e-commerce capability, and the like) from a cloud-based website hosting solution. Such a cloud solution service delivery interface that is abstracted from underlying website or web presence hosting architectures via a virtualization layer 104 may further facilitate decoupling the provisioning of architectures (e.g. 108A to 108N) to meet the cloud solution requirements from a user-centric cloud solution service delivery capability for providing solution services.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SAAS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, net books, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

We claim:

1. A website hosting platform for hosting a plurality of websites, the system comprising:
   a first website hosting architecture including at least a first server, wherein the first website hosting architecture provides first website hosting services to a first website hosting client and includes a first website hosting client user interface for facilitating interaction with the first website hosting services by the first website hosting client;
   a second website hosting architecture that is distinct from the first website hosting architecture, and includes at least a second server, wherein the second website hosting architecture provides second website hosting services to a second website hosting client and includes a second website hosting client user interface for facilitating interaction with the second website hosting services by the second website hosting client; and
   a virtualization layer that abstracts the first website hosting client user interface from the first website hosting architecture, abstracts the second website hosting client user interface from the second website hosting architecture, and adapts interactions of the first and the second website hosting clients with each of the first and second website hosting architectures to facilitate providing a website hosting client a consistent experience via a common website hosting user interface for all client interactions with the first and second website hosting architectures.

2. A system for website hosting service delivery, the system comprising:
   a plurality of distinct website hosting control panels including a first control panel and a second control panel configured to provide website hosting management capabilities to a plurality of website owners, wherein each of the plurality of distinct website hosting control panels provides a direct interface to a corresponding distinct website hosting architecture selected from a first website hosting architecture including at least a first server and the first control panel and a second website hosting architecture including at least a second server and the second control panel, wherein the first website hosting architecture provides first website hosting services to the plurality of website owners, and wherein the second website hosting architecture provides second website hosting services to the plurality of website owners; and
   a website hosting server executing a virtualization layer configured to enable the plurality of distinct website hosting control panels by abstracting the capabilities of at least one of the first and the second control panels directly interfaced with a corresponding one of the first and the second website hosting architecture and provide a common control panel for the plurality of website owners to access the website hosting management capabilities independent of the website hosting architecture providing the capabilities.

3. The platform of claim 2, wherein the virtualization layer interfaces with a first website control panel of the first website hosting architecture and with second website control panel of the second website hosting architecture, and wherein the first and the second control panels effect different website hosting client user interface experiences.

4. The platform of claim 3, wherein the virtualization layer harmonizes the user interface differences of the first and the second control panels to provide a website hosting client with a consistent user interface experience via the website hosting client user interface.

5. The system of claim 2, wherein the virtualization layer adapts interactions between the plurality of distinct website hosting control panels and a plurality of website hosting architectures to facilitate providing a client a consistent experience for all client interactions with the first and second website hosting architectures.

6. The system of claim 2, wherein a portion of the plurality of distinct website hosting control panels are configured to interface with at least one type of website hosting architecture, and wherein the virtualization layer adapts interactions between the portion of the plurality of distinct website hosting control panels and types of website hosting architectures other than the at least one type of website hosting architecture.

7. A website hosting platform, comprising:
   a first website hosting architecture including at least a first server, wherein the first website hosting architecture provides first website hosting services and includes a first website hosting client user interface for facilitating interaction with the first website hosting services by a first website hosting client;
   a second website hosting architecture that is distinct from the first website hosting architecture, and includes at least a second server, wherein the second website hosting architecture provides second website hosting services and includes a second website hosting client user interface for facilitating interaction with the second website hosting services by a second website hosting client; and
   a virtualization layer that abstracts the first website hosting client user interface from the first website hosting architecture, abstracts the second website hosting client user interface from the second website hosting architecture, and adapts interactions with each of the first and second website hosting architectures to facilitate providing a website hosting client a consistent experience via a common website hosting user interface when configuring the first and second website hosting services for a single website, wherein the virtualization layer provides the services for operating the single website including providing the first website hosting services from the first website hosting architecture and providing the second website hosting services from the second website hosting architecture.

\* \* \* \* \*